US008311864B2

(12) United States Patent  (10) Patent No.: US 8,311,864 B2
Norelli  (45) Date of Patent: Nov. 13, 2012

(54) ENERGY AND ENTROPY ASSESSMENT OF A BUSINESS ENTITY

(75) Inventor: Ronald A. Norelli, Charlotte, NC (US)

(73) Assignee: Ronald A. Norelli & Company, Charlotte, NC (US)

( * ) Notice: Subject to any disclaimer, the term of this patent is extended or adjusted under 35 U.S.C. 154(b) by 0 days.

(21) Appl. No.: 13/123,352

(22) PCT Filed: Oct. 9, 2009

(86) PCT No.: PCT/US2009/060193
§ 371 (c)(1),
(2), (4) Date: Apr. 8, 2011

(87) PCT Pub. No.: WO2010/042837
PCT Pub. Date: Apr. 15, 2010

(65) Prior Publication Data
US 2011/0196712 A1   Aug. 11, 2011

Related U.S. Application Data

(60) Provisional application No. 61/104,580, filed on Oct. 10, 2008.

(51) Int. Cl.
*G06Q 40/00* (2012.01)
(52) U.S. Cl. ...................... 705/7.11; 705/7.42
(58) Field of Classification Search ............. 705/7, 7.11, 705/7.42
See application file for complete search history.

(56) References Cited

U.S. PATENT DOCUMENTS

| 7,865,383 B2* | 1/2011 | Tafoya ...................... 705/7.36 |
| 2002/0169658 A1 | 11/2002 | Adler |
| 2005/0125322 A1* | 6/2005 | Lacomb et al. ................ 705/35 |
| 2005/0171833 A1 | 8/2005 | Jost et al. |
| 2006/0015377 A1* | 1/2006 | Hoogs et al. ...................... 705/7 |
| 2006/0116922 A1 | 6/2006 | Homann et al. |
| 2007/0226099 A1* | 9/2007 | Senturk-Doganaksoy et al. ........................ 705/35 |
| 2007/0299720 A1* | 12/2007 | Tafoya ........................ 705/11 |
| 2008/0312988 A1* | 12/2008 | Trapp et al. ...................... 705/7 |
| 2009/0112809 A1* | 4/2009 | Wolff et al. ...................... 707/3 |

OTHER PUBLICATIONS

Theory and methodology—A neural network for classifying the financial health of a firm—R.C. Lacher 1995; Received Nov. 1991; revised Jul. 1993 pp. 1-13.*
The International Bureau of WIPO, International Preliminary Report on Patentability and Written Opinion of the International Searching Authority for International Application No. PCT/US2009/060193 dated Apr. 21, 2011.

* cited by examiner

*Primary Examiner* — Thomas Dixon
*Assistant Examiner* — Benjamin S Fields
(74) *Attorney, Agent, or Firm* — Moore & Van Allen PLLC; Deborah Hill Spencer; Andrew D. Gerschutz

(57) ABSTRACT

Embodiments of the present invention provide an energy and entropy analysis of a business entity. Embodiments of the present invention provide a computer-implemented method for calculating a metric indicative of a business entity's strategic health at a specific point in time, comprising obtaining a measurement of energy, obtaining a measurement of entropy, identifying at least one linkage between the energy measurement and the entropy measurement, and calculating a metric indicative of the business entity's current strategic health at the specific point in time.

24 Claims, 2 Drawing Sheets

ENERGY AND ENTROPY ASSESSMENT OF A BUSINESS ENTITY

CROSS-REFERENCE TO RELATED APPLICATIONS

This application is filed under the provisions of 35 U.S.C. §371 and claims the benefit of International Patent Application No. PCT/US2009/060193, filed on Oct. 9, 2009, entitled "Energy and Entropy Assessment of a Business Entity" in the name of Ronald A. Norelli, which claims priority of Provisional Patent Application No. 61/104,580, filed on Oct. 10, 2008, both of which are hereby incorporated by reference herein in their entirety.

BACKGROUND

The success of a business entity in today's dynamic economy depends on many factors. Every business entity should be adept at adjusting to change, adapting to complex external environments, and updating to stay competitive. Unfortunately, doing so is easier said than done.

SUMMARY

Embodiments of the present invention provide a computer-implemented method for calculating a metric indicative of a business entity's strategic health at a specific point in time, comprising obtaining a measurement of energy, obtaining a measurement of entropy, identifying at least one linkage between the energy measurement and the entropy measurement, and calculating, based on the measurement of energy, the measurement of entropy, and the at least one identified linkage, a metric indicative of the business entity's current strategic health at the specific point in time.

In some embodiments, the present invention further comprises repeating the method for calculating a metric indicative of a business entity's strategic health to calculate at least a second metric indicative of the business entity's current strategic health at an at least second point in time.

In some embodiments, the invention comprises a data processing system for producing a metric indicative of a business entity's strategic health, the data processing system comprising: a database comprising attributes of energy; a database comprising attributes of entropy; a database comprising linkages between energy and entropy; and a central processing unit (CPU) and computer program code, execution of which causes the CPU to calculate a metric indicative of the business entity's current strategic health based on the attributes of energy, the attributes of entropy, and the linkages between energy and entropy.

A system implementing an embodiment of the invention can include a network functionally interconnecting the computing resources that form the energy and entropy databases, including databases containing energy attributes, databases containing entropy attributes and databases containing linkages between energy and entropy. Computing resources that make up the system of an embodiment of the invention in combination with appropriate computer program code can provide the means to implement an embodiment of the invention by the computer program code being executed on a processor and/or computer to perform calculations and to maintain storage media encoded with business entities' strategic health data and/or a computer program product including the computer program code itself.

BRIEF DESCRIPTION OF THE DRAWINGS

Figure 1:
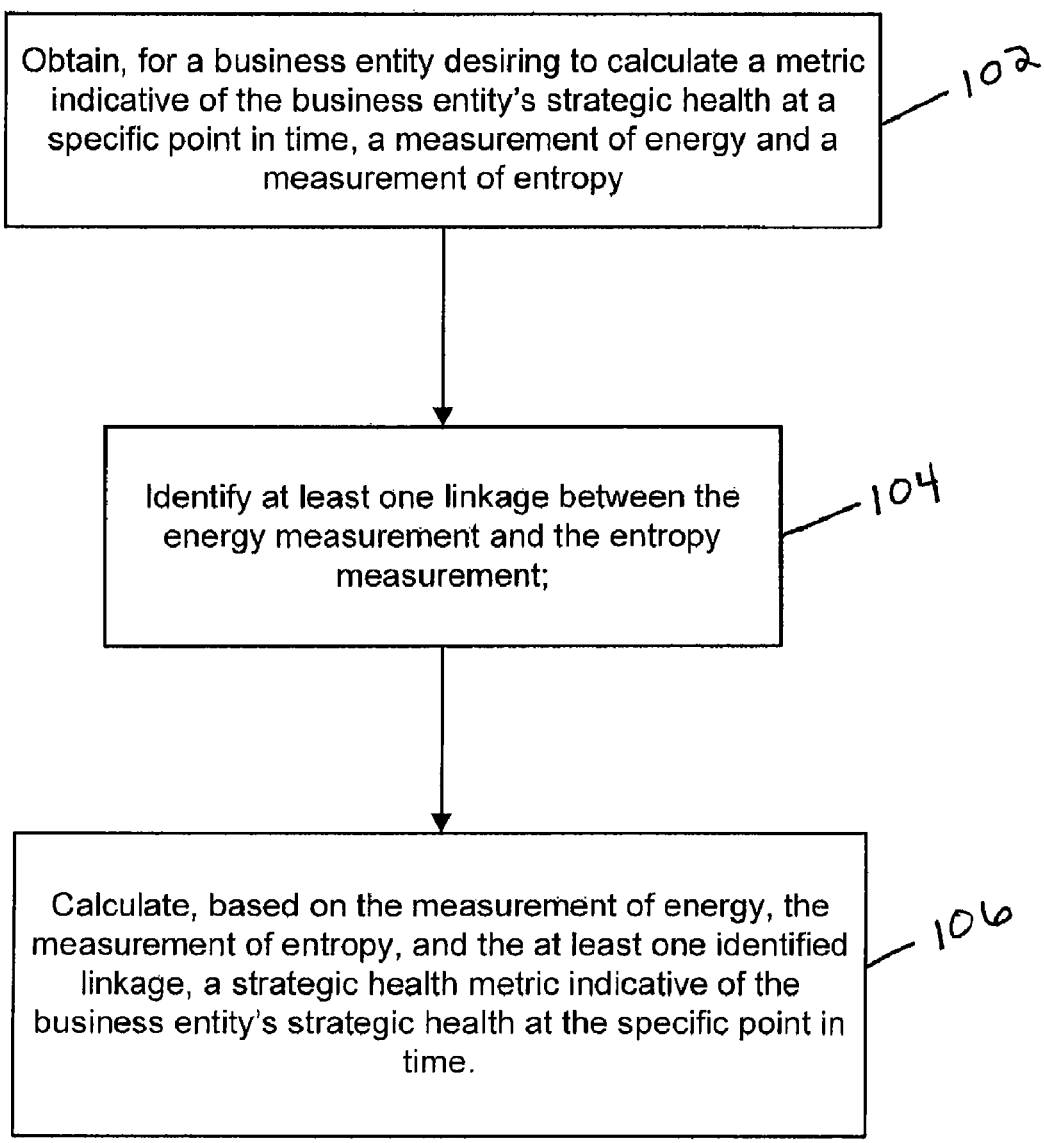

Having thus described embodiments of the invention in general terms, reference will now be made to the accompanying drawings:

FIG. 1 is a flowchart depicting a method of calculating a metric indicative of a business entity's strategic health at a specific point in time according to example embodiments of the invention.

Figure 2:
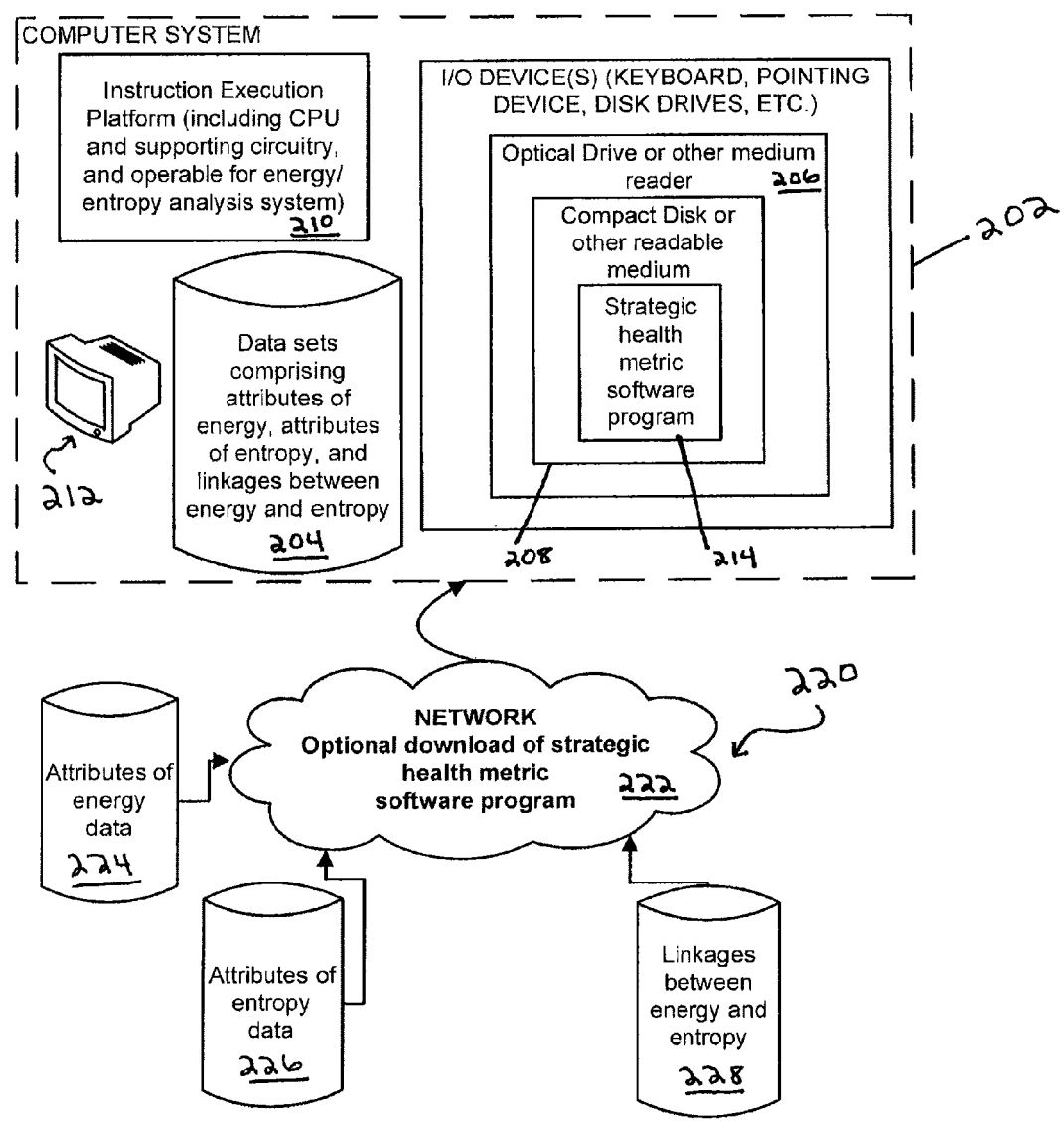

FIG. 2 is a system block diagram for example embodiments of the present invention. In this example, system 100 illustrates a system including an entropy and energy analysis of a business entity's strategic health according to example embodiments of the invention.

DETAILED DESCRIPTION OF THE INVENTION

The present invention will now be described in terms of specific, example embodiments. It is to be understood that the invention is not limited to the example embodiments disclosed. It should also be understood that not every feature of the systems and methods described is necessary to implement the invention as claimed in any particular one of the appended claims. Various elements, stages, processes, and features of various embodiments of systems, apparatus, and processes are described in order to fully enable the invention. It should also be understood that throughout this disclosure, where a process or method is shown or described, the steps of the method may be performed in any order or simultaneously, unless it is clear from the context that one step depends on another being performed first. Also, time lags between steps can vary.

As will be appreciated by one of skill in the art, various portions of the present invention may be embodied as a device, method, system, computer program product, or a combination of the foregoing. Accordingly, the present invention may at least partially take the form of a software embodiment (including firmware, resident software, micro-code, etc.) or an embodiment combining, in various portions, software and hardware aspects that may generally referred to herein as part of a "system". Software and/or hardware may be utilized in combination with a device or method as described herein. Furthermore, embodiments of aspects of the present invention may take the form of a computer program product on a computer-readable medium having computer-usable program code embodied in the medium.

Embodiments of the present invention are described below with reference to flow chart illustrations, spreadsheets and tables, and/or block diagrams of methods and apparatus (systems), which may include computer program products. It will be understood that a block of the flow chart illustrations, spreadsheets and tables, and/or block diagrams, and/or combinations of blocks in the flow chart illustrations, spreadsheets and tables, and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flow chart, spreadsheets and tables, and/or block diagram block or blocks.

The computer program instructions may be loaded onto a computer or other programmable data processing apparatus to cause a series of operational steps to be performed on the computer or other programmable apparatus to produce a computer-implemented process, such that the instructions which execute on the computer or other programmable apparatus provide steps for implementing some of the functions/acts specified in the flow chart, spreadsheets and tables, and/or block diagram block(s). Alternatively, computer program implemented steps or acts may be combined with operator or human implemented steps or acts in order to carry out an embodiment of the invention.

The following description is based on an exemplary implementation of an embodiment of the invention for use in calculating a metric indicative of a business entity's strategic health.

The term "entropy", or "corporate entropy", as used herein, is a measurement of a system's overall capacity for, or propensity to, change. Entropy refers to a measurement of a system's capacity to undergo spontaneous change. Entropy also refers to a measurement of the disorder in a system. Entropy also refers to a measure of the irreversibility in natural change processes involving a system and its surroundings. Entropy also refers to a measure of the dissipation of energy in a system undergoing change.

The term "energy", or "corporate energy", as used herein refers to the business entity's overall health and competitive strength, and its ability to seize opportunity. Stated another way, the term "energy", or "corporate energy", is the sum of strategic and organizational attributes that make a business strong. These can include size, physical mass, speed, intensity of effort, infrastructure and technology, brands, market position, special or dominant core competencies, management depth and discipline, exceptional human resource development and financial capacity.

The term "strategic health" as used herein refers to the current ability of a business entity to compete successfully and sustain growth, while proactively initiating timely change so that its competitive strength is maintained.

The invention described herein can be used in analyzing the strategic health of any type of business entity. One type of business entity that may be analyzed by embodiments of the invention described herein is a family business. As used herein, the term "family business" refers to a business entity in which at least two members of the same family participate in the business. Although the degree of ownership by the family can vary from none to 100 percent, the family has some influence on the strategic direction of the business.

Discussed herein are the concepts of corporate energy and entropy, also referred to herein as energy and entropy, as they apply to a business entity. Each of energy and entropy can be measured by examining attributes indicative of current status of the business entity. Each attribute is further divided into "performance indicators" (PIs) that more specifically examine different aspects of each attribute.

Attributes of energy and entropy as they are used in at least some embodiments of the invention are depicted in Table 1.

TABLE 1

| Attributes of Energy: | Attributes of Entropy: |
|---|---|
| Size, physical mass, scalability | Propensity to change quickly and/or in great leaps |
| Speed, intensity of effort | High risk tolerance |
| Infrastructure, technology | Tendency toward random, fluid structure |

TABLE 1-continued

| Attributes of Energy: | Attributes of Entropy: |
|---|---|
| Brands, market position and power | Undisciplined style, susceptibility to distractions |
| Special or dominant core competencies | Contrariness, out-of-the-box thinking |
| Management depth; focus | Exceptional creativity |
| Disciplined and exceptional human resource development | Broad, perhaps unrelated, product and business unit diversity |
| Financial strength, access to capital | |

FIG. 1 is a flowchart depicting a method of calculating a metric indicative of a business entity's strategic health at a specific point in time according to example embodiments of the invention. The method of calculating a metric indicative of a business entity's strategic health at a specific point in time can also be referred to as an energy/entropy analysis system.

According to some embodiments of the present invention, the energy/entropy analysis system provides a method of calculating a metric indicative of a business entity's strategic health at a specific point in time, wherein the method requires obtaining a measurement of energy and a measurement of entropy (102).

The measurements of energy and entropy are obtained by analyzing attributes, or characteristics, of each of energy and entropy. Each energy attribute and each entropy attribute is further divided into performance indicators, which are even more specific analyses of facets of each attribute.

Linkages between energy measurements and entropy measurements are identified by analyzing lists of possible linkages between energy attributes and entropy attributes (104). Effects of entropy attributes and energy attributes are viewed as "linkages" in the sense that the status of one affects the status of the other. Identifying measurements for energy attributes and entropy attributes, and the linkages or correlations between them, allows not only a calculation of a metric indicating the current strategic health of the business entity, but also provides information as to what aspects of the business entity may be in need of improvement.

A strategic health metric is calculated for the business entity based on the measurement of entropy, the measurement of energy, and the at least one linkage identified between the energy measurement and the entropy measurement (106). In some embodiments, a strategic health metric may be calculated for a second point in time and compared to the strategic health metric calculated for a specific point in time. In at least some embodiments, it is also possible to compare energy measurements, entropy measurements, and strategic health metrics from one business entity to another.

Tables 2(a) and 2(b) extend the "attributes" of corporate energy and entropy to another level by breaking down each into specific "Performance Indicators," (PIs) along with a tabulation scale corresponding to the axes on the Corporate Energy/Entropy Matrix™ (see Table 7 herein). The number of the energy and entropy attributes (and PIs) is consistent throughout this specification.

Table 2(a) shows the energy attributes discussed below as they would occur in at least some embodiments of the invention.

TABLE 2(a)

Attributes With Performance Indicators

| | High (3) | Medium (2) | Low (1) | Don't Know/Not Sure (0) |
|---|---|---|---|---|
| Attribute #1: Size, mass, scalability | | | | |
| (1) Ratio of Actual Sales/Breakeven Point | ≧1.4 times | 1.2-1.39 times | 1.0-1.19 times | <1.0 times |
| (2) Percent Sales growth required to improve EBIT/Sales by (a) 20 percent, (b) 40 percent (c) 60 percent | | (measurement cut points to depend upon desired increment; the lower the number the better) | | Not possible: EBIT already < 0 |
| (3) Capacity utilization relative to the industry | ≦0.5 | 0.51-0.75 | >0.75 | Not applicable ("NA") |
| (4) Investment needed to increase capacity | Incremental | Combination of incremental and large steps | Large steps | NA |
| (5) Percent sales growth achievable without fixed capacity additions | >50% | 20-50% | <20% | NA |
| (6) | | | | |
| Attribute #2: Speed, intensity, unity of purpose | | | | |
| (1) Does current business model mesh with its Mission Statement? | Yes | (no "Medium" score) | No | Mission Statement doesn't exist |
| (2) Do Core Values and Purpose fit with the customer value proposition/marketing theme? | Yes | (no "Medium" score) | No | Values/Purpose unknown |
| (3) Where does the company place on the "Corporate Identity Matrix?" (See added text) | Innovator | Settler or Pioneer | Conservator | NA |
| (4) Are there intra-business unit barriers (e.g., employees working at cross purposes)? | No | (No "Medium score) | Yes | Don't Know |
| (5) What is the average time to market on Innovations? | <6 months | 6 months-1 year | <1 year | Don't know |
| (6) Existence/importance of Board (Directors or Advisors) | Meaningful, with some independence | Meaningful, all insiders | Exists, but not meaningful | Does not exist |
| Attribute #3: Infrastructure, technology | | | | |
| (1) Age of IT/ERP Systems | <2 years | 2-5 years | <5 years < 10 | ≧10 years |
| | High (3) | Medium (2) | Low (1) | Don't Know/Not Sure (0) |
| (2) What is the average age of company facilities? (net book value/gross book value) | ≧0.6 | 0.31-0.6 | >0 ≦ 0.3 | 0 |
| Attribute #4: Brands, market position, power | | | | |
| (1) Percent of business segments market share ranked number 1 or 2 | ≧75% | 26-75% | ≦25% t | Don't know/Can't estimate |
| (2) Business's relative market share vs. three largest competitors (weighted average by served markets) | >60% | 26-59% | ≦25 percent | Don't know/Can't estimate |
| (3) Management's competitive "style" | Aggressive, strong-arm, quick to retaliate | Selectively aggressive where it can be | Passive follower | NA |
| (4) Quality relative to competitors | Generally Clearly Superior | Often Superior | Equivalent | Often Inferior or Don't Know |
| (5) Relative price (compared to leading competitors) | ≦1.1 times | 1.2-1.3 times | >1.4 times | Don't know |
| (6) Relative price/relative quality index (see added text, "Relative Value Matrix") | Price low vs. quality (value high) | Price, quality in balance (value in balance) | Price too high vs. quality (value low) | Don't know |
| (7) Are customer surveys actually performed? | Regularly, and independently done | Regularly, internally done | Sporadic, internally done | Rarely, if at all |
| (8) Has the business been successful making significant complementary acquisitions? | Yes | (no "Medium" score) | No | NA |
| Attribute #5: Special or dominant competencies | | | | |
| (1) Importance of patents and/or trade secrets | Essential to competitive advantage | It depends on the market the product is sold to | Non-existent and/or not meaningful | NA |
| (2) Licensing income/royalty revenue, relative to industry norm | >1.4 times | 1.1-1.4 times | ≦1.1 times | NA |
| (3) EBIT margin relative to industry norm | >1.4 times | 1.1-1.4 times | ≦1.1 times | EBIT < 0 |
| (4) Operating effectiveness vs. peer group(s): (a) inventory turns (b) receivables turns (c) total asset turnover | Top quartile | Second quartile | Bottom half | Don't know/Don't track |
| (5) Special QA, LEAN manufacturing, environment or safety, or other recognized certifications | ISOs, Six Sigma, safety or environmental certs well-established, extended | 1 or 2 installed, early training in progress | Early in certification process(es) | None/not considering |

TABLE 2(a)-continued

Attributes With Performance Indicators

| | High (3) | Medium (2) | Low (1) | Don't Know/Not Sure (0) |
|---|---|---|---|---|
| Attribute #6: Management depth; exceptional human resource development | | | | |
| (1) Is there succession planning at corporate level, including Board of Directors? | Yes | No "Medium" score | No | Don't know/Not sure |
| (2) Cumulative time of top five executives spend at Board and/or senior management level over careers | >30 years | 20-30 years | <20 years | NA |
| (3) Are the right people in the right spots (perhaps from employee surveys) | Yes | No "Medium" score | No | NA |
| (4) Percent of promotions filled from within | >50% | 25-50% | <25% | Don't know/not measured |
| (5) Expenditures on training, continuing education, leadership seminars, etc. as a percent of revenue, relative to industry norm | >1.4 times | 1.1-1.4 times | ≦1.1 times | Don't know/not measured |
| (6) Employee compensation relative to industry norm | Top quartile | Second quartile | Bottom half | Don't know/not measured |
| Attribute #7: Discipline, Accountability | | | | |
| (1) Percent executive compensation fixed versus incentive | <50% | 50-80% | >80% | NA |
| (2) Attitude towards corporate values (from internal evidence and/or surveys) | Consistent deviations from corporate values not tolerated, incompatibility a reason for not hiring a candidate | Intentions good, tolerance of deviation infrequent | Values perceived as easily compromised | Values not generally known |
| (3) Effectiveness of employee review process | Effective at career development, attracting, keeping the best people | Meaningful sometimes, but not uniformly consistent throughout | Don't exist/not meaningful, little differentiation | Counterproductive, morale sapper |
| (4) Definition of outstanding performance | Results and impact on business performance | Leans towards effort/good intentions | Low, little differentiation, excuses commonplace | NA |
| (5) Frequency and effectiveness of management reviews of business unit performance | Monthly | Quarterly | Infrequently, ad hoc, accomplish little | Never occur |
| Attribute #8: Financial Resources | | | | |
| (1) Performance relative to peer group: (a) current ratio (b) interest coverage (c) return on assets | Top quartile | Second quartile | Bottom half | Don't know |
| (2) What is the company's sustainable growth, using sustainable growth equation? G = (D/E)(Ri)p + Rp* | ≧12% | 5-11% | 0-4% | <0 |
| (3) Has business's recent performance actually created new shareholder value? (a) Sales growth for 3-5 years (Using CAGR over 3 or 5 years; see Entropy Attribute #1, PI #2 | ≧12% | 5-11% | 1-4% | <1% |
| (b) Degree to which business's incremental "Real Strategic margin" exceeded the "Minimum Threshold Margin" over the period (see added text) | ≧0.40 | 0.20-0.39 | 0.0-0.19 | <0 (value actually dissipated) |
| (4) Capacity for increased leverage (increase in D/E possible while coverage stays at or above peer median) | ≧1.5 times | 1.15-1.49 times | 1-1.14 times | <1, i.e., coverage already below peer median |

Energy attribute #1 is "size, mass, scalability". Energy attribute #1 is used to assess the significance of the business as a force in its industry, and the business's ability to get stronger as it grows. The PIs for energy attribute #1 are primarily quantitative indicators.

Definition of Terms for Energy Attribute #1:

Breakeven Point ("$BEP_0$"). The level of revenue at which there is neither an operating profit nor a loss.

Total Fixed Costs ("FC"). Those costs in a business that generally don't change over a wide sales range.

Variable Costs ("VC"). Those costs that generally change in proportion to sales volume.

Operating Profit Margin. Equals earnings before interest and taxes; ("EBIT")÷Sales.

PI #1. Actual Sales÷$BEP_0$ $$BEP_o = \frac{FC}{[1 - (VC/Sales)]}$$

for a profitable business, this ratio must be >1.0; and @<1.0, business as is loses money; making it difficult to sustain growth without outside capital infusion. Over time, the business will lose its strength and financial health.

PI #2 (a)-(c). Measures how much the revenue must grow to produce a higher operating profit margin (i.e., EBIT/Sales) the lower this number, the better, meaning that the business's cost structure is such that profit would go up quickly if sales were increased;
(a) for calculation, treat the required profit margin improvement as an added "variable cost;" to increase EBIT/Sales by 20%, then $$BEP_{+20} = \frac{FC}{[1 - (VC/\text{Sales}) - 0.2]}$$

then calculate $BEP_{+20} \div BEP_o$

% Sales Growth Needed to produce the added profit improvement=

$$\frac{BEP_{+20} - BEP_o}{BEP_o},$$

for increase of 20% in EBIT/Sales
for b, c repeat, using 0.4 and 0.6, instead of 0.2
four possible scores are possible with measurement cut-points individually developed for a, b, and c.

The smaller this number, the more "scalable" the business is, and the higher the gross profit margin, which is a well established and fundamental characteristic of a competitively "strong" business.

PI #3. Investment required to grow.
Indicator recognizes the degree to which new capacity can be added "incrementally" (requiring less new capital), a lower number increases a business's scalability, or at least makes it more likely that the business can grow (a) less expensively, (b) more quickly and/or, (c) with lower visibility to competitors.

PI #4. Percent sales growth achievable without adding fixed investment.
a slightly different measure than PI #3, also relating to scalability, and the resultant cost of growth;
the capacity to grow considerably without adding fixed capacity greatly enhances a business's overall strength; and produces more free cash flow than the situation where a business must add capacity quicker and in larger chunks. This also results in "shareholder value" going up more quickly. (See Attribute #8, PI#3 (b).)

Performance Indicators 3 and 4 are generally measurable from internal information, and thus easier to determine.

PI #5. Capacity utilization relative to the business's industry.
the lower the number, the better, for same reasons as stated in PI #3; and
this ratio requires some "competitive intelligence," which usually can be obtained from industry statistics or studies, or by debriefing salespeople and other industry participants, such as suppliers, trade press, and commentators, or by analyzing competitors' balance sheets (when available).

Three possible scores are available for PIs #3, #4 and #5.

Energy attribute #2 is "speed, intensity, unity of purpose". Energy attribute #2 is used to assess the business's ability to prioritize and focus on the appropriate things, marshall commitment and sustain organization unity, and the ability to execute and adjust and recover from missteps.

Definition of Terms for Attribute #2:
Core Values. List of basic beliefs and philosophies that undergird the way in which the business conducts business; meant to be inherently valuable and unchanging.

Core Purpose. A brief phrase or statement ($\leq 10$ words) of the reason the business exists; best expressed in terms of the fundamental benefit delivered to customers.

Mission Statement. A summary of the important ways the business differentiates itself while defining the boundaries of its competitive effort. Could include a brief "Marketing Theme" (the message the business wants to convey; <6-8 words) and Value Proposition (basic mechanisms for delivering value to customers).

Corporate Identity Matrix ("CIM"). Characterizes the business's style and culture in terms of an intersection on two dimensions, its (a) degree of organizational structure, and (b) decision-making style and criteria. Table 3 illustrates the CIM.

TABLE 3

ORGANIZATION STRUCTURE

| DECISION-MAKING STYLE | Highly Structured | Very Fluid |
|---|---|---|
| Very Intuitive | "Settler" | "Pioneer" |
| Highly Analytical | "Conservator" | "Innovator" |

PI #1. Consistency of actual Business Model with the Mission Statement.
"High Energy" response "Yes." "Low Energy" response "No."
"Zero Energy" response is Mission Statement "doesn't exist or unknown."

PI #2. Do Core Values and Purpose "fit" with the Value Proposition and Marketing Theme (see Mission Statement)?
Response options similar to PI #1.

PI #3. Business's "style, culture" as characterized from CIM.
"High" Energy response is "Innovator" (e.g., a flexible or fluid structure, supported by strong analysis).
"Medium" Energy responses those with more intuitive decision-making styles, regardless of structure (but absence of strong analytics, can mean more prone to mistakes, strategies based on faulty assumptions).
"Low" Energy response "Conservator" . . . suggesting much less likely to be an industry leader (e.g., overemphasis on financial measures of success; producing short-term outlook, vulnerable to losing ground to competitors; slow to move).

PI #4. Existence of intra-business unit barriers (e.g., differences in culture and style, different measures of success, counterproductive incentive systems, competitive conflicts, attitudes of "just don't respect one another," etc.).
"High" Energy response is "No."
"Low" Energy response is "Yes."
"Zero" Energy response is "Unknown."

Sources of necessary information for PIs #1-4 are internal: surveys, employee interviews, assessment of incentive systems, reviews of internal strategic plan; differences in strategy, etc.).

PI #5. Time to market on innovations.
"High" answer is the shortest time, which would tend to build or extend competitive advantage and enhanced growth rates.
Longer times ("Medium" or "Low") indicate weakness or the threat of weakness, in terms of growth, eroding profit margins, ever eroding morale and increased employee turnover.
"Zero" response is not measuring, not knowing.

PI #6. Existence/Importance of Board of Directors (the "Board"). Recognizes importance of an active Board, with emphasis on "independence" (generally accepted definition of "independence" available publicly, usually means not only an outsider, but one whose only connection to business and other Board members is his/her Board membership).
"meaningful" Board meets regularly, readily challenges management, sets standards and expectations high, well-balanced in terms of experience and expertise, and includes outside members that also are independent (this gives a high score).
Board of all insiders less likely to be a source of competitive strength and higher Corporate Energy through objectivity and different points of view (this gives a medium score if Board still "meaningful").
a low score is an existent Board judged to not be "meaningful".
a zero score is a nonexistent Board.

Energy attribute #3 is infrastructure and technology. Energy attribute #3 assesses and rewards the business's ability to commit to up-to-date and well thought out information systems and regular reinvestment in value-adding facilities and equipment as sources of competitive strength.

PI #1. Age of information systems, as an indicator of providing timely, accurate and meaningful information and analysis on which to base important decisions, including customer and product profitability, adequacy of inventory strategy, business unit financial and operations performance; and early warning indicators.
Aging information systems can result in inadequate or misleading information, and less timely decisions; and perhaps less of a commitment to overall industry leadership.

PI #2. Age of company facilities and equipment.
Reasons and implications similar to PI #1.
Plus aging equipment can result in margin deterioration, putting stress on growth potential, and ultimately create financial strain.
Four scores are available for PIs #1 and #2 as shown in Table 2(a).

Energy attribute #4 is "brands, market position and marketing power". Energy attribute #4 assesses the combined interactions of the business entity for competitive pricing, high perceived quality and strong market positions.
Definitions of terms for attribute #4 include the following:
Served Market. The actual market segment(s) in which business makes a competitive effort.
Market Share Rank. Business's overall rank within Served Market (i.e., #1, 2, 3 . . . etc).
Relative Market Share. Business's estimated % share of Served Market÷Combined Share of 3 largest competitors.
Relative Quality (perceived). Company's estimate of how quality of products (and/or services) are perceived by customers, divided into categories of Clearly Superior, Essentially Equivalent, and Clearly Inferior.
Relative Price. The Business's average selling prices÷competitors' average.

PI #1. Percentage of the Business's Served Markets in which it enjoys a certain Market Share Rank.
PI #2. Business's Relative Market Share across all its Served Markets (weighted by Served Market Size).
"High" assessments on PIs #1 and 2 are strong indicators of Corporate Energy.
Data regarding Served Market sizes and competitor shares vary in availability. Internet or published studies, sales force and other stakeholder intelligence, trade associations, published market studies for a fee, and industry analysts all possible sources.
Note that "Don't Know, Can't Estimate" are given Zero scores in recognition of importance to effective strategic management of a business to at least estimating and monitoring its market positions.

PI #3. Aggressiveness of management style.
"High" score given to business whose sales and marketing management is aggressive, works hard for every order and rarely concedes that a lost order is acceptable.

PI #4. Relative Quality.
Assessment made between 4 options:
"High"—generally Clearly Superior
"Medium"—often Clearly Superior
"Low"—generally Equivalent
"Zero"—often Inferior or Don't Know
Substantiation for above originally came out of decades of research, including the former Strategic Planning Institute, emphasizing value of Superior Quality, while noting the powerful leverage of a Clearly Superior position on sustainable and high return on investment.

PI #5. Relative Price.
Small "premium" (i.e., prices ≦1.1 times competitors') given "High" rating based on same reasons as PI #1. Rewards leveraging growth potential over maximizing short-term profit margins, market share increases could be enhanced by more competitive pricing.
Four possible scores are available for PI #5 per Table 2(a).

PI #6. "Relative Value Matrix." Table 4 shows the relative value matrix.

TABLE 4

RELATIVE VALUE MATRIX

| | | Generally Inferior | Generally Equivalent | Often Superior | Generally Superior |
|---|---|---|---|---|---|
| RELATIVE PRICE | >1.5 | ZERO | LOW | LOW | MEDIUM |
| | >1.2-1.5 | ZERO | LOW | MEDIUM | MEDIUM |
| | 1.0-1.2 | LOW | MEDIUM | HIGH | HIGH |
| | <1.0 | MEDIUM | MEDIUM | HIGH | HIGH |

Relative Quality
Relative Value Matrix rewards strong leverage when Superior Quality is combined with relatively competitive selling prices, because of potential to grow faster than market and create barriers to entry.
Also suggests danger of pricing too high for the quality level, whether driven by inaccurate knowledge of the perceived quality or excessively high product costs.

PI #7. Existence/frequency of customer surveys.
Regular and accurate customer survey information is (a) critical for accurate assessment of Relative Quality and Price; (b) early warning for deterioration of either measure in (a); and (c) uncovering unsatisfied needs that could spawn new products/services.
Scoring rewards conducting customer surveys/interviews using independent resources.

"Zero" score exists when "Rarely, if ever, done."

PI #8. Is there a successful acquisition record?

If "Yes," represents potential for enhanced "Corporate Energy," whether through acquiring complementary products, extending geographic reach, entering related Served Markets, or acquiring new technological expertise.

A "no" answer results in a "low" score.

Referencing "Corporate Energy," acquisitions are assumed to be "related" (impact of Unrelated Acquisitions addressed in Corporate Entropy assessment).

Energy attribute #5 is "special or dominant competencies". Energy attribute #5 assesses existence of features that make the business entity stand out when compared to competitors. Existence of significant intellectual property, consistently high-operating margins and/or superior operating performance can strengthen a business by (a) creating barriers to entry; (b) producing higher growth rates; (c) ability to sustain higher rates of marketing and new product development expenditures; and (d) higher investment rates than competitors.

Definitions of Terms for Attribute #5:

Inventory Turns. Average Inventory level÷Cost of Goods Sold ("COGS").

Receivable Turns. Sales÷Average Receivables levels.

Total Asset Turnover. Sales÷Total Net Assets (average for year).

PI #1. Importance of patents and/or trade secrets as sources of meaningful competitive advantage.

Assessments could be based on industry studies, investment solicitation (offering) documents, opinions of key industry stakeholders, management judgment.

PI #2. Existence and level of revenue generated from intellectual property, relative to industry norm.

Licensing and/or royalty income as % of total sales, relative to industry norm. Possible sources of information trade groups, industry reports, for-purchase special research studies, customized research, offering memorandums and documents.

Three possible scores are available for PI #1 and #2 as per Table 2(a).

PI #3. Operating Margin relative to industry norm (EBIT÷Sales).

"High" score if >1.4 times.

"Medium" if 1.1-1.4 times.

"Low" if ≦1.1 times.

"Zero" if EBIT <0 [business losing money at operating profit level (i.e., before interest expense and other non-operating expenses/income)].

PI #4(a)-4(c). Effectiveness of the business as measured in asset productivity (measured as Inventory Turns, Receivables Turns, and Total Asset Turnover).

"High" requires performance in Top Quartile.

"Medium" requires Second Quartile (i.e., above Peer Group median).

"Low" signifies Bottom Half of peer group.

"Zero" if performance vs. peer group(s) not known or business doesn't track the ratios.

PI #5: Special quality management or similar certifications.

4 possible answers

"High" is ISOs, Six Sigma, Lean Manufacturing, other environmental, design, safety certifications well-established and enhanced "Medium" is "1 or 2 now installed and being extended"

"Low" is "early in certification processes"

"Zero" is "None, No Plans"

Peer group data can be generally obtained from trade groups, industry studies, offering documents or published annual statement studies for many industries from sources such as well-known and highly regarded Risk Management Associates ("RMA," published in fall, available through hard copy or electronic subscription).

Energy attribute #6 is "management depth; exceptional human resource development". Energy attribute #6 assesses the business's ability to manage the necessary and never-ending requirement for building and sustaining corporate energy by maintaining excellence in people.

PI #1. Existence of succession planning at corporate level, including the Board.

"High" score is "Yes."

"Low" score is "No."

"Zero" score is Not Knowing

PI #2. Cumulative experience in senior level positions for senior-most executives is important measure, as noted outstanding executive recruiters insist that prior success is highest probability indicator of success in current/future positions.

"High" score is >6 years per individual, on average.

"Medium" is 4-6 years average.

"Low" is <4 years.

PI #3. Are right people in the right spots? Taken from Collins/Porras book *From Good to Great* (i.e., "Are right people on bus and sitting in the right seats?")—as the critical prerequisite for effective strategy development and implementation, in the authors' opinion.

Simple "Yes" or "No" answer (for "High"/"Low" scores)

PI #4. % of promotions throughout company made from within is important indicator of quality of hiring, training, career development, and morale. Having to recruit new people to fill important roles too often is a sign of weakness in human capital development.

"High" score is >50%.

"Medium" score is 25-50%.

"Low" is <25%.

"Zero" score is "Don't Know" or "Not Measured."

For PIs #1-4, sources of required information are generally internal: employee surveys, HR records and files. For high profile public companies, there could be public reports from outside observers and analysts.

PI #5. Commitment to quality and consistency of investments in human capital development (once reported in Fortune as a common thread reported by employees companies awarded status or "Top Companies to Work For").[1]

[1] As were "providing a nice place to work" and "standing for something I believe in and can relate to." Both are covered in earlier Attributes.

Scores are based on expenditures as % of revenue, compared to particular industry norms.

"High" score >1.4 times.

"Medium" score 1.1-1.4 times.

"Low" score <1.1 times.

"Zero" score is "Don't Know/Not Measured."

PI #6. Employee compensation relative to industry norms. Intentionally recruiting from the "top of the talent pool" is a component of successful recruiting, retention and performance on the job.

"High" score: Top Quartile.

"Medium" score: Second Quartile (above Median).

"Low" score: Bottom Half.

"Zero" score "Don't Know/Don't Measure."

Information needed to measure PIs #5 and 6 generally obtained from business's internal records, stated recruiting and compensation strategies, external employer or trade surveys, or internal confidential surveys carried out by the business itself.

Energy attribute #7 is "discipline; accountability". Energy attribute #7 assesses the business's ability to consistently execute strategy, accomplish stated goals, and attract and develop outstanding talent.

PI #1. % of executive compensation that is fixed (i.e., salary) vs. incentive (bonuses, stock, etc.). A substantial portion being incentive is best.

"High" score <50%.
"Medium" score 50-80%.
"Low" score >80%.

PI #2. Company approach to Corporate Values. Taken from fundamental lessons presented in Built to Last, also by Collins, Porras.

There are four possible scores, with "High" denoting uncompromising adherence, with incompatibility a reason to not hire an individual; "Zero" score being "Values Unknown."

PI #3. Effectiveness of employee review process. Intent of this Indicator is to assess whether the review process is a positive or a negative to the business in question.

There are four possible scores, with descriptions as shown self-explanatory.

This Indicator included because of significant body of published commentary on the difficulty in keeping performance reviews constructive to the business.

PI #4. Definition of outstanding performance. Purpose of the Indicator is to separate those businesses that set performance at challenging level from those that generally don't differentiate much between those who truly make a difference from those who don't.

Differences in scoring criteria self-explanatory. Three scores are possible.

Information needed to apply PIs #1-4 generally available from internal employee surveys, and customized employee interviews.

PI #5. Frequency and effectiveness of management reviews of business unit performance. Purpose is to assess degree to which management consistently monitors what is happening within the business unit. An effective process can serve as an effective training mechanism for developing management talent while improving communication and instilling a culture of accountability.

Energy attribute #8 is "financial resources". Energy attribute #8 assesses the business's financial resources, its ability to withstand stresses while seizing opportunities and extending competitive advantage. Consistently strong financial performance generally follows strength in underlying business model strength, and fundamentally increases shareholder value.

Definition of Terms for Energy Attribute #8:

Current Ratio. The ratio of current assets to current liabilities.

Interest Coverage. The ratio EBIT÷Interest Expense (pretax); the number of times annual interest expense is "covered" by operating income (this particular form of the ratio referred to as "operating" version).

Return on Assets (ROA). Usually expressed as Pretax Income ("PTI")/Total Net Assets, a measure of return on investment.

Cost of Capital (or minimum hurdle rate). The discount rate "k" used in a net present value calculation, as a weighted average. The target "k" is usually a calculated estimate that varies from one business to another; the calculation of which generally requires input and expertise of the Chief Financial and/or Chief Investment Officer.

$\Delta$Working Capital, "w". The change in working capital over a period of n years÷$\Delta$Sales, Working Capital=[Current Assets (excluding cash), less Current Operating Liabilities]; ÷$\Delta Sales_n$.

$\Delta$Net Capital Expenditures, "f". The amount of total capital expenditures less depreciation expense over the "n" period, per unit of Sales Increase ($\Delta Sales_n$).

New Shareholder Value. New economic value to equity holders of a business as a result of the business's performance. Its fundamental basis is a discounted cash flow calculation. Calculation to be described in PIs 3 (a, b) apply technique to historical actual results. (Alternatively, calculation could be applied to forward-looking projections developed as part of a business's strategic plan).

Minimum Threshold Margin ("MTM"). The minimum incremental operating margin needed to just return the business's estimated cost of capital, measured as $\Delta$EBIT/$\Delta$Sales over n year period.

Real Strategic Margin ("RSM"). The difference between the actual incremental operating margin earned by the business over n year period and the MTM.

Tax Rate ("T"). The average tax rate applied to pretax earnings over the n year period.

Other Specific Terms

D/E (debt/equity) Ratio of funded debt (interest bearing) to total shareholder equity.

Net Operating Profit after tax=NOPAT=R.

i=interest rate (which is pretax for simple coverage calculation; after tax when used in "Sustainable Growth" equation, see below.

Dividend payout ratio=Dividends paid÷net income.

Fraction earnings retained=p*; =(1−dividend payout ratio).

PI #1, (a)-(c). Current Ratio, Interest Coverage Ratio, and Pretax Return on Assets vs. Peer Group. (Peer Group determined in same manner as Attribute #3).

For PI #1, (a)-(c), there are 4 possible scores:
"High"=Top Quartile
"Medium"=Second Quartile
"Low"=Bottom Half (below Median)
"Zero"=Don't Know PI #2. The business's ability to "sustain" growth over period of years (without infusion of external capital). Interpreted as capacity to grow "cheaply" and "safely;" seize opportunities when others can't.

$$G_s = (D/E)(R-i)p^* + Rp^*$$

4 possible scorings:
"High"=$\geq$12%
"Medium"=5-11%
"Low"=0-4%
"Zero"=<0

PI #3 (a, b). Examine degree to which the business's recent historical performance has actually created new shareholder value. Performing the calculation as outlined below requires either 4 or 6 years of the most recent actual operating results, including year-end balance sheet, for the first and last years used (i.e., a base year "0," and either 3 or 5 years thereafter).

Reasoning behind this PI is that the increase in equity value of a business over time is directly proportional to (1) the increase in sales revenue ($\Delta$Sales) over that time period; and (2) the degree to which the incremental operating profit margin over the same period ($\Delta$EBIT/$\Delta$Sales) exceeds the minimum incremental threshold operating margin needed to just return the business's estimated cost of capital (the RSM).

PI #3(a). The increase in sales over the chosen period:

$$\Delta Sales = Sales_{year\, n} - Sales_{year\, "0"}$$

where n represents either year 3 or 5; year "0" represents base year

Use calculation for "Compound Annual Growth Rate" ("CAGR") as employed in Entropy calculation; Attribute #1, PI#2, as follows:

$$CAGR(\%\ per\ year) = (Sales_{year\, n}/Sales_{year\, 0})^{1/n} - 1$$
where $n = 3$ or $5$ Four possible scores:
 "Highest" is $\geq 10\%$ per year
 "Medium" is 5-9% per year
 "Low" is 1-4% per year
 "Zero" is $\leq 1\%$ per year PI#3(b). Calculation of the RSM and the comparison with MTM. Calculation procedure as follows:

$$MTM = [(f+w)k]/[(1+k)(1-T)]$$

subtract MTM from the actual $(\Delta EBIT \div \Delta Sales)_{nyears}$ to obtain $$(\Delta EBIT)/(\Delta Sales)_{nyears} - MTM = RSM$$

then calculate degree to which RSM exceeds MTM over the selected time period:

$$= (RSM - MTM)/MTM$$

4 possible scores for PI#3(b):
 "Highest" $\geq 0.40$
 "Medium" 0.20-0.39
 "Low" 0.0-0.19
 "Zero" $<0$ PI #4. Capacity to increase leverage (i.e., a higher D/E ratio). Represents ability of business to increase its debt while staying within acceptable ratio of Interest Coverage.

For ease of calculation, Interest Coverage equation can be transformed algebraically from $$Coverage_{oper} = \frac{EBIT}{Interest\ Expense\ (pretax)}$$

to "strategic expression" = $Coverage_{strategic}$ [R(1+D/E)]/(i D/E), R, i after tax Calculation process:
(a) check Peer Data to find Median for Interest Coverage
(b) set that Median # to equal above equation:

$$COV_{med} = \frac{R(1 + D/E_{med})}{i(D/E_{med})}$$

(c) Solve (b) for "$D/E_{med}$"
(d) Calculate ratio of $(D/E_{med}) \div (D/E)$ actual 4 possible scores:
 "High" $\geq 1.5$ times (i.e., the D/E ratio could go up by 50% without business falling below Interest Coverage Median).
 "Medium" = 1.15-1.49 times.
 "Low" = 1-1.14 times.
 "Zero" = <1, i.e., coverage already below Median.

Entropy attributes are used to assess (a) a business or business entity's (i) attitude towards and (ii) inherent propensity to change, (b) its track record at demonstrating its abilities to implement change, and (c) assess what degree of future change it could safely undertake given its overall profile on the corporate energy axis (covered in other spreadsheet). And, it is important to remember that optimum overall placement on the Corporate Entropy axis of the Corporate Energy/Entropy Matrix™ is "Medium," not High or Low. Table 2(b) shows the entropy attributes and PIs.

TABLE 2(b)

Attributes With Performance Indicators

|  | High (3) | Medium (2) | Low (1) | Don't Know/Not Sure (0) |
|---|---|---|---|---|
| Attribute #1: Propensity to change quickly or in great leaps | | | | |
| (1) Dividend payout ratio, last three years | <0.1 | 0.11-0.39 | >0.4 | Net income <0, while still paying dividends |
| (2) Compound annual sales growth rate vs. Industry over five year period | $\geq 1.25$ times | 1-1.24 times | <1 time | Not sure/Don't know |
| (3) Sum of R&D, plus marketing expenses, % sales vs. industry average, 3-5 years | $\geq 2.0$ times | 1.0-1.99 times | <1.0 time | Not sure/Don't know |
| Attribute #2: High risk tolerance | | | | |
| (1) Frequency of relatively large acquisitions increasing corporate revenue by $\geq 25\%$ over 3-5 years | $\geq 1$ per year | >1 but <1/year | 1 | None |
|  |  |  |  | NA |
| (2) % of sales from "new" products or services, year period (£2 years old) | $\geq 30\%$ | 6-29% | $\leq 5\%$ | NA |
| (3) Ratio Debt/Total Capital [D/(D + E)] | $\geq 0.7$ | 0.21-0.69 | $\leq 0.2$ | NA |
| (4) Interest coverage risk (% EBIT drop before coverage ratio <1) | $\leq 25\%$ or EBIT <0 | 26-70% | >70% | No Debt |

TABLE 2(b)-continued

Attributes With Performance Indicators

| | High (3) | Medium (2) | Low (1) | Don't Know/Not Sure (0) |
|---|---|---|---|---|
| Attribute #3: Tendency towards random, fluid structure | | | | |
| (1) Decision-making style (see added text; "Corporate Identity Matrix") | Highly Intuitive, gut-feel reigr | Middle-ground of analytical, intuitive | Very analytical, all numbers | NA |
| (2) Organization "style," degree of structure (also see added text) | Extremely fluid, undefined | ~50/50, fluid vs. structure | Highly structured, top-down | Rigid, hierarchical |
| (3) Definitions of success | Unknown, constantly changing, or perceived as arbitrary | Not frequently changing, hybrid of financial and growth measures | Consistent, whatever numbers say | NA |
| (4) Control systoms for monitoring and feedback | Infrequent, unclear, perceived lacking in importance | Balanced | Frequent, on schedule, clear and followed up, perceived as time consuming | NA |
| (5) Dress code | Non-existent | Business casual | Traditional, buttoned-up | NA |
| (6) Physical environment | Open workspaces for all | Middle ground | Traditional, with walls, doors | Long distances between hallways, floors, buildings |
| Attribute #4: Contrariness, irreverence, independent thinking, dealing with ambiguity | | | | |
| (1) Willingness to fall | Consequences rare, or perceived non-existent | Trying new ideas encouraged but milestones and decision points exist | Expect "certainty" from beginning, quick to pull plug | Mistakes punished, bad news withheld |
| (2) Is business right or left brain dominant? (see added text) | Clear "right" dominance, disdainful of "left" | Healthy mix; understands difference, values both | Clear "left" dominance, doesn't understand nor appreciate value of "right" | NA |
| Attribute #5: Exceptional creativity | | | | |
| (1) Differentiation of new products/services | Usually greater than or equal to two levels beyond currrent industry norm | Ahead of current industry, concern over being trumped | Generally incremental change | Me, too, none perceived; Don't Know |
| (2) Years since last significant new product or service | <2 | 2-3 | ≧4 | Don't Know |
| (3) Percent of current sales with replacement products/services in works | ≧50% | 21-49% | ≦20% | "Ain't broke" syndrome/fear cannibalization |
| (4) Willingness to revisit old Ideas once rejected or unsuccessful | Stretched too thin already | Yes | No ("we tried that once") | Would never ask, disdainful |
| (5) Consistently Fresh vs. Inbred organization | Tendency to always look outside for new talent | Infusions from outside not rare (key positions) | Almost always promotes from within | Don't Know, not measured |
| Attribute #6: Broad business unit diversity | | | | |
| (1) Number of separate industries served | 3 or more | 2 | 1 | NA |
| (2) 80% percent of sales coming from Served Markets with share rank of: | 4 or "lower" | 2 or 3 | 1 | Don't know share rank |
| (3) Perceived meaningful synergies between businesses | Potential, but unrealized (lacking focus, fragmented attention span) | Meaningful and fulfilled | Little or none (lack creativity, intellectual curiosity) | NA |
| (4) Acquisition success/failure | Judged to have had multiple failures | Completed >1 acquisition; >50% judged successful | Completed ≦1 acquisition | NA |

As noted previously, "entropy" as used herein may be defined as:

1. A measurement of a system's capacity to undergo spontaneous change.
2. A measurement of the disorder in a system.
3. A measure of the irreversibility in natural change processes involving a system and its surroundings.
4. A measure of the dissipation of energy in a system undergoing change.

These four interpretations of entropy are reflected throughout the attributes and PIs, often simultaneously. Though an oversimplification, the "disorder" factor can be prominent when evaluating the business's structure, measures of success, physical environment, or "being stretched thin" are mentioned. "Irreversibility" tends to be a factor in risk tolerance, being slow to act, lost opportunities, and the many "Low entropy" "Don't Know/Don't Measure" measures. "Dissipation" of energy can be a major consequence of "high entropy" answers: being unfocused, spreading resources too thin, consequences of failed strategy or pursuing weak strategies to begin with.

The spontaneous "change" reference pervades much of the spreadsheet, beginning with Attributes 1 and 2. These many "faces" of entropy are illustrated Table 5.

TABLE 5

THE MANY "FACES" OF CORPORATE ENTROPY
Interpretations of Corporate Entropy

| | | Performance Indicators of Entropy Attributes | | | | | |
|---|---|---|---|---|---|---|---|
| "FACES" OF CORPORATE ENTROPY | "Spontaneous" Change | PIs 1, 3 | PIs 1, 3, 4 | PIs 1-4, 6 | PIs 1, 2 | PI 5 | PI 4 |
| | Disorder | PI 3 | PIs 1-4 | PIs 1-6 | PIs 1, 2 | PIs 2, 4 | PIs 1, 3, 4 |
| | Irreversibility | PIs 1-3 | PIs 1, 2 | PIs 1, 3, 4 | PIs 1, 2 | PIs 1-4 | PIs 2, 3 |
| | Energy Dissipation | PI 3 | PIs 1, 2 | PIs 1, 3, 6 | PIs 1, 2 | PIs 3, 4 | PIs 1-4 |
| | | Attribute #1 | Attribute #2 | Attribute #3 | Attribute #4 | Attribute #5 | Attribute #6 |
| | | CORPORATE ENTROPY ATTRIBUTES | | | | | |

Entropy is a measurement, and the term has physical units (energy÷temperature) in the physical world. So a linkage between energy and entropy, as used in scientific terminology, is fundamental to the roots of the entropy function. (In fact, in proposing his new function, Rudolph Clausis in 1865 noted "I have designedly coined the word entropy to be similar to energy, for these two qualities are so analogous in their physical significance . . . ")

In similar fashion, application of the method will reveal many potential linkages by which the values for individual entropy PIs can, in fact, influence individual energy PIs in both positive and negative ways. This can be especially significant when tracking changes in a business entity's strategic health over time. Many possible "linkages" are shown in Table 6.

tion both directly and indirectly of what the organization's weak points are. The direct links include identifying attributes for which the business entity has a score indicative of a negative impact on the organization. The indirect links include making correlations, based on linkages such as those shown in Table 6, between attributes identified as potential sources of problems for an organization and attributes that are linked with the directly identified potential problem source.

For example, PIs 1 and 2 of entropy attribute #1 are linked to PIs 3-5 of energy attribute #1 (see text below and tables 2(a) and 2(b) for explanations of the attributes). Thus, looking at tables 2(a) and 2(b), it is seen that the business entity's propensity to change quickly or in great leaps, as evidenced by dividend payout ratio and compound annual sales growth rate vs. the industry, is linked to, or shows correlative activity

TABLE 6

THE CORPORATE ENERGY/ENTROPY MATRIX
Most Likely Potential for Linkages Over Time
Influence of Entropy Attributes and PIs on Energy Attributes and PIs

| | | Entropy PIs (right side) Influencing Energy PIs (left side) | | | | | | | | | | | |
|---|---|---|---|---|---|---|---|---|---|---|---|---|---|
| CORPORATE ENERGY ATTRIBUTES | Attribute #8 | PIs 1-4 | PIs 1-3 | PIs 1-4 | PIs 1, 3, 4 | PIs 2-4 | PIs 1, 3, 4 | PIs 1-4 | PIs 1, 2 | PIs 2-4 | PIs 1-4 | PIs 1-4 | PIs 1-4 |
| | Attribute #7 | PIs 1, 4, 5 | PIs 1, 3 | PIs 2-5 | PIs 1, 3, 4 | PIs 1-5 | PIs 1-6 | PIs 1-5 | PIs 1, 2 | PIs 1-5 | PIs 1-5 | PIs 1-5 | PIs 1-4 |
| | Attribute #6 | PIs 2, 4-6 | PIs 1, 3 | PIs 2-5 | PIs 1, 3, 4 | PIs 1, 3-6 | PIs 1, 3-6 | PIs 3-5 | PIs 1, 2 | PIs 1-6 | PIs 1-5 | PIs 2, 3, 6 | PIs 2, 3 |
| | Attribute #5 | PIs 1-5 | PIs 1-3 | PIs 1-3 | PIs 1-4 | PIs 1, 2, 5 | PIs 1-4 | PIs 1, 2, 5 | PIs 1, 2 | PIs 1-5 | PIs 1-4 | PIs 1-5 | PIs 1-4 |
| | Attribute #4 | PIs 1-8 | PIs 1-3 | PIs 1, 2, 4-6, 8 | PIs 1, 2 | PIs 1-8 | PIs 1-6 | PIs 1-8 | PIs 1, 2 | PIs 1-8 | PIs 1-5 | PIs 1-8 | PIs 1-4 |
| | Attribute #3 | PIs 1, 2 | PIs 1, 2 | PIs 1, 2 | PIs 1, 3, 4 | PIs 1, 2 | PIs 3-6 | PIs 1, 2 | PIs 1, 2 | PIs 1, 2 | PIs 1-4 | PIs 1, 2 | PIs 1-4 |
| | Attribute #2 | PIs 2, 3, 5 | PIs 2, 3 | PIs 1-6 | PIs 1, 2 | PIs 1-4, 6 | PIs 1-6 | PIs 1-6 | PIs 1, 2 | PIs 1-6 | PIs 1-5 | PIs 1-6 | PIs 1-4 |
| | Attribute #1 | PIs 3-5 | PIs 1, 2 | PIs 1-5 | PIs 1-4 | | | | | PIs 1-5 | PIs 1-4 | PIs 1-5 | PIs 1-4 |
| | | Attribute #1 | | Attribute #2 | | Attribute #3 | | Attribute #4 | | Attribute #5 | | Attribute #6 | |
| | | CORPORATE ENTROPY ATTRIBUTES | | | | | | | | | | | |

Table 6 shows the correlative relationship between attributes of energy and the attributes of entropy in at least some embodiments of the invention. Specifically, the data in Table 6 is presented as the influence of entropy attributes on energy attributes. In some embodiments, the data in Table 6 comprises the data that is included in the lists of linkages between measurements of energy attributes and measurements of entropy attributes. In at least some embodiments, the data as shown in Table 6 comprises the data stored in a database of linkages between energy and entropy.

The linkages as shown in Table 6 show that identifying a business entity's strategic health at a given time, by measuring attributes of energy and entropy, provides a good indication with, the business entity's size, mass and scalability as evidenced by capacity utilization relative to the industry, investment needed to increase capacity, and percent sales growth achievable without fixed capacity additions.

In the physical world, the important measurement is the change in entropy as processes unfold, not the absolute value. For application of the Corporate Energy/Entropy Matrix™, the beauty of the concept is that the method can be used to track the changes in the status of a business as a consequence of strategic action, or as a default consequence of inaction as external changes naturally occur. Actual calculation of ΔS (change in entropy) in the physical world results in logarithmic solutions; so the changes themselves are numerically small from one physical state to another.

Following are the entropy attributes measured herein that in at least some embodiments of the invention are used to calculate the strategic health of a business entity. Entropy attribute #1 is "propensity to change quickly and/or in great leaps". Entropy attribute #6 assesses the breadth of the business's competitive diversity.

Definition of Terms for Entropy Attribute #1:

Dividend Payout Ratio ("PR"). The fraction of the business's net income paid to shareholders (instead of reinvested in business; see also Attribute #8; Corporate Energy spreadsheet). Average for previous three years.

Compound average annual sales growth rate, over five most recent years ("CAGR," % per year).

Sum of expenditures on R&D, plus marketing activities, as a % of sales ("Differentiation Expenses").

PI #1. Dividend Payout Ratio, summed over last 3 years.

$$= \frac{\text{(dividends paid out)}}{\text{(net income after taxes)}}$$

as an Indicator for Corporate Entropy, this ratio would be low, if not zero (i.e., profits stay in the business, indicative of a longer-term, growth-oriented posture).

in some closely-held, family businesses, "dividends paid" may be disguised as unusual bonuses, shareholder distributions, excessive officer compensation, family consulting contracts . . . all expenditures not really necessary for normal operations.

Four possible scores:
"High" entropy=PR≦0.1
"Medium" entropy=0.11-0.39
"Low" entropy=≧0.40
"Zero" score if Net Income ≦0, yet Dividends still being'paid PI #2. CAGR of business over most recent 5 full years, relative to industry or Served Market growth rates.

CAGR=[(Sales$_{yr5}$/Sales Base$_{yr0}$)$^{1/n}$−1] where
$n$=number of years measured;

Calculation most meaningful with at least 5 full years of data.

Four possible scores:
"High" ≧1.25 times industry
"Medium" 1-1.24 times industry
"Low" <1.0 times, meaning business not keeping up with industry
"Zero" if Don't Know/Not Sure; indicating business doesn't follow events in its industry closely enough PI #3. Differentiation Expenses as % of Sales, also relative to industry (at least 3 years, preferably 5).

R&D expenses include product engineering and/or development, R&D project management, new technology research or development, outside engineering consultants, patent and/or trademarking expenses; should not include manufacturing engineering or "value" engineering primarily focused on cost reduction of existing product or processes; and all Marketing and Sales expenses Also 4 possible scores:
"High" ≧2.0 times industry
"Medium" 1-1.99 times
"Low" <1.0 times industry
"Zero" Not Sure/Don't Know Internal data needed to calculate PI's #2 and 3 should be readily available. If not, that should indicate "Don't Know/ Not Sure." Industry data obtained from numerous possible sources; customized research, trade publications, sales force intelligence, media sources, trade associations, etc.; often requires commitments of time and persistence.

Entropy attribute #2 is "high risk tolerance". Entropy attribute #2 assesses the business's ability and willingness to change; its recognition that it should be opportunistic, and the degree to which it can sustain change.

Definition of Terms for Attribute #2:

Sales from new products or services. The % of revenue in the business generated from products and/or services that are ≦2 years old.

Ratio of Debt (interest-bearing) to Total Capital (Debt plus Equity).

Interest Coverage (EBIT/interest expense). For this Attribute, use the "operating version" of this calculation (see Attribute #8, Corporate Energy spreadsheet).

PI #1. Degree to which business has consistently grown via relatively large acquisitions. Growing by acquisition is inherently risky, the strategy is at least somewhat "irreversible" (meaning that a failure can't be reversed without some lasting consequence).

measure is based on a multi-year period (preferably 3-5).
measure is average annual frequency of completing large acquisitions (those that increase business's revenue by ≧25%).
4 possible scores:
"High" is average of ≧1 per year
"Medium" is <1 per year, but >1 acquisition
"Low" is 1 acquisition, period
"Zero" is "None" at all PI #2. Measures how much sales revenue consistently comes from new products/services; those that in any given year are no more than two years old. New product development and introduction are inherently risky; failures typically outnumber successes. Persistence also a measure of risk tolerance.

3 possible scores:
"High" ≧30% over 5-year period (3 years ok if additional data not available)
"Medium" 6-29%
"Low" ≦5%

Note that measurement period is longer than the definition of "new product." So a steady stream of new business must be forthcoming over the period as once new products/services rotate out of the new category.

PI #3. Measures the degree to which the business is willing to take on financial risk as part of its strategy.
measure is Debt÷Total Capital (i.e., D/(D+E)).
3 possible scores:
"High"=D/(D+E)≧0.7
"Medium"=0.21-0.69
"Low" is ≦0.20
note that willingness to take on debt will increase the business's "Sustainable Growth" rate so long as business's return on investment exceeds the interest rate on the debt (see Attribute 8, PI #2 from Corporate Energy spreadsheet).

PI #4. Interest coverage risk; a measure of the probability that an unexpected shortfall in the business's operating results can threaten ability to cover interest expense.
for simplicity of calculation, use the "operating" version of the coverage ratio: COV=EBIT/interest expense (see Attribute 8, PI#1(b) and 3 from Corporate Energy spreadsheet).

specific measure is % of EBIT drop before coverage becomes <1 (i.e., operating profit doesn't cover interest).
calculation process:

calculate actual(or planned)$COV_{plan}$=($EBIT_{plan}$/interest actual)

then % $\Delta EBIT_{drop}$ until coverage drops below 1 is $1-(1/COV_{plan})$ expressed as a %
4 possible scores:
  "High" is ≦25% (which includes case where $EBIT_{plan}$ is already negative
  "Medium" 26-70%
  "Low" is >70%
  "Zero" is business has no debt
Entropy attribute #3 is "tendency towards random, fluid structure". Risk-taking, innovativeness, and creativity are all enhanced by less (rather than more) structure, and almost an organizational disdain for over-analysis and excessive reliance on predictability and numbers.
Definitions of Terms for Attribute #3:
Corporate Identity Matrix ("CIM"). Reference Definition of Terms for Attribute #2 on Corporate Energy spreadsheet.
PI #1. Characterization of business's decision-making style. Note definitions from CIM.
  3 possible scores:
    "High" is "Highly intuitive; gut feel reigns"
    "Medium" is "Middle ground of intuitive, analytical"
    "Low" is "Very analytical; all numbers"
PI #2. Organizational style, structure. Also note CIM.
  4 possible scores:
    "High" is "Extremely fluid, undefined"
    "Medium" is "50/50 mix, fluid vs. structure" (probably indicative of frequent use of interdisciplinary task forces)
    "Low" is "Highly structured, top-down"
    "Zero" is "Rigid, hierarchical"
Sources of data the same as noted for Attribute #2, PI #3 for Corporate Energy.
PI #3. Definitions of success. Very insightful indicator as to the business's culture and how (or even if) it manages the change process.
  3 possible scores:
    "High" is "unknown, constantly changing, or perceived as arbitrary"
    "Medium" is "not frequently changing, a hybrid of financial and growth measures"
    "Low" is "consistent, whatever numbers say"
PI #4. Control systems for monitoring and feedback.
  3 possible scores:
    "High" is "infrequent, unclear, perceived as lacking importance, (or signs of negative attitude)
    "Medium" is "Balanced (and emphasizing follow-up)
    "Low" is "very frequent, focused on numbers, must stay on schedule, perceived as time-consuming" (to a fault)
Sources of data for PI's #3 and 4 are generally internal; including employee interviews, as well as review of written incentive plans.
PI #5. Physical environment: dress code.
  3 possible scores:
    "High" entropy is "non-existent"
    "Medium" is "business casual"
    "Low" is "traditional, even 'buttoned-up'"

PI #6. Physical environment: office layout.
  4 possible scores:
    "High" "open workspaces for all"
    "Medium" "a middle ground"
    "Low" "traditional, with walls and doors"
    "Zero" "long distances between hallways, floors, buildings"
considerable research has been done over decades to quantify impact of physical layout on communication in organizations where technical innovation important.
  role of Tom Allen, Professor Emeritus at MIT Sloan School
  "frequency of communication drops [exponentially] by ⅔ for every 90 feet between two offices . . . and that's if on the same hallway with no corners" . . .
  curves get progressively worse if (a) turn a corner, (b) change floors, or (c) go outside to different building
Best data sources for PIs #5 and 6 are physical observation. Easy, inexpensive to do, and quick.
Entropy attribute #4 is "contrariness, irreverence, independent thinking, able to deal with ambiguity". One commonly referenced and known definition of entropy is degree of disorder and/or chaos in a system. In order to have a strong propensity to change, an organization must contain a willingness and tolerance for people eager and wired to go against the grain; challenge the past and status quo.
Definitions of Terms for Attribute #4:
  "Left-brain" orientation. Individual strengths are quantitative, sequential, analytical, probably more risk-adverse and a view of issues as more black and white; uses facts to make points.
  "Right-brain" orientation. Strengths more oriented to artistic and design, uses stories to make points, more big-picture vision rather than sequential; comfortable with shades of gray, see linkages not generally perceived or obvious by/to others.
PI #1. Willingness to fail.
  In order to have good ideas that can be sources of new growth and business vitality, there must be tolerance of ideas that don't work.
  4 possible scores:
    "High" is "consequences rare, or perceived to be non-existent"
    "Medium" is "trying new ideas encouraged, but milestones, decision points exist"
    "Low" is to expect "certainty" from outset; quick to pull plug when obstacles, unexpected setbacks occur
    "Zero" "mistakes punished; bad news withheld"
PI #2. Is business "right" or "left brain" dominant?
  many traditional business's have emphasized importance of left brain thinking, sometimes with disdain towards or ignorance of the right side
  many have written recently that tomorrow's business success requires an equal mixture (in context of a global war for talent amidst greater commodization)
  3 possible scores:
    "High" is "clear 'right' dominance, disdainful of 'left'"
    "Medium" is "hearty mix, understands difference, values both"
    "Low" is "clear left dominance; doesn't understand nor appreciate values of right"
Data for PIs #1 and 2 can be straightforward to obtain (employee interviews, HR files (though access can be restricted)), incentive plans and observation. Some can be more subtle, with evidence of physical environment, existence of stories about play at work or atmosphere at company outings, or whether personality testing is done for positions at certain levels. Use of external resources for HR planning perhaps an indication that differences are understood and valued.

Entropy attribute #5 is "exceptional creativity". Creativity drives change, and Corporate Entropy is all about change. Businesses lacking creativity almost sure to be "Low Entropy," and vulnerable to decay and threats from inevitable changes in external environments.

PI #1. Differentiation objectives for new products/services.
    4 possible scores:
        "High" is "usually greater than or equal to 2 levels beyond where industry currently is"
        "Medium" is "ahead of current industry; concern over being trumped
        "Low" is "generally incremental change"
        "Zero" is "'me too', no perceived differences; or Don't Know"

PI #2. Time since last significant now successful new product/service; in years.
    4 possible scores:
        "High" is <2 years
        "Medium" is 2-3 years
        "Low" is $\geq$4 years
        "Zero" is "Don't Know"

PI #3. Percent of current sales with replacement products/services under development. In more crude terms, this can be seen as the attitude towards "cannibalization."
    4 possible scores:
        "High" is $\geq$50% (i.e., business wants to be its own cannibal!)
        "Medium" is 21-49%
        "Low" is $\leq$20%
        "Zero" is "Ain't broke syndrome; fear of cannibalization;" very indicative of a short-term, numbers-driven culture, lacking in vision PI #4. Willingness to revisit ideas once rejected or previously unsuccessful.
    shows attitude that just because the idea didn't work once, timing in past may not have been right
        "High" entropy is "stretched too thin already" to even consider
        "Medium" is "Yes"
        "Low" is "No;" (i.e., common refrain of "we tried that once . . . ")
        "Zero" is "would never ask," sign of disdain or weakness Company records, business plans, interviews with sales force, marketing staff, and/or technical development staff are sources of information. Trade journals, media reports, securities offering documents also possible.

PI #5. Consistently fresh vs. an inbred organization.
    dangers of inbred organization when considering propensity to change seem obvious. But always going outside for new people can also be danger sign. Could suggest haphazard recruiting or development processes, excessive capriciousness or perfectionism in senior management, or being too scattered to even pay attention to human capital development issues (poor attention span—an organization with ADD!).
    4 possible answers
        "High" is "tendency to always go outside"
        "Medium" is "infusions from outside not rare for key positions"
        "Low" is "almost always promote from within," a sign of being inbred; even the narrow belief that others can "never know our business; we're different"
        "Zero" is "Don't Know/not measured"

Data on above should be available internally.

Entropy attribute #6 is "broad business unit diversity". Business long-term health demands a balance of focus/concentration on one hand, with a stable of future growth opportunities on the other. Excessive fragmentation and "blinders," risk aversion, and complacency are equally dangerous.

PI #1. Number of separate industries served (with minimal links between them).
    3 possible answers:
        "High" is $\geq$3
        "Medium" is 2
        "Low" is 1

PI #2. Are sources of revenue competitively strong businesses, or revenue coming from a group of "mediocre" businesses (Low or Medium Corporate Energy)?
    measured as: 80% of sales coming from Served Markets where Market Share Rank is . . . '
    4 possible scores
        "High" is #4 or lower (i.e., 5, . . . )
        "Medium" is 2 or 3
        "Low" is 1, an indicator of risk aversion and/or excessive vulnerability to attack from without
        "Zero" is "Don't Know/Don't Measure"

See Attribute #1, PIs 1 and 2 from Corporate Energy spreadsheet for Definitions of Terms, and sources of information.

PI #3. Perceived meaningful synergies between businesses.
    does unity diversity accomplish anything beyond just more sales, customers, people, administrative cost? Is total business stronger because of diversity, or is the diversity a non-factor at best?
    3 possible scores:
        "High" is "potential there, but unrealized" (lack of focus, too fragmented attention span)
        "Medium" is "meaningful and being fulfilled," always requires conscious effort and persistence
        "Low" is "little or none" (i.e., lacking creativity, intellectual curiosity)

PI #4: Acquisition success/failure.
    unsuccessful acquisitions dissipate energy, impose huge opportunity costs, and distract a business. I've seen the need to address poorly-conceived acquisitions actually lead to failure of entire business.
    3 possible scores
        "High" is "judged to have had multiple 'failures'"
        "Medium" is "completed >1 acquisition, with >50% success rate"
        "Low" is "0-1 acquisition completed"

All business entities when considered in entirety with their external environments are complex systems. Family businesses can be even more complex than other types of businesses. Each of the methods and systems described herein may be applied to any business entity, including a family business. Effective change management is critical; the struggle is how best to accomplish it. Popular wisdom has often touted revolutionary change, bold out-of-the-box initiatives and institutionalized disorder—"high entropy" characteristics according to the above definitions—as essential to long-term business health. But specific examples, taken from family business client experiences and presented below, appears inconclusive.

In the first specific example, Northwest Cathodic ("NWC"), a family-controlled proprietary technology and process development enterprise, was compelled to pursue one such "bold, out-of-the-box initiative" as regulatory changes increased demand for the company's core technology. Management pushed a "big-leap" strategy: forward integration into actual operations of a new plant designed and built by itself. But, overly optimistic assumptions, lack of critical knowledge and expertise, and inadequate financial systems and controls doomed this strategy from the beginning. The life-threatening liquidity crisis hit, seemingly without warning.

In the second specific example, Electronics Innovation, Ltd. ("EIL"), a late first-generation manufacturer of automotive aftermarket components, had embarked upon an aggressive acquisition program involving both forward and backward integration and international expansion. Revenues jumped by 50%. Complementary product lines and marketing channels were added, along with a strategic beachhead in Asia. The Founder and his second-generation management team were lauded in the industry. Within six months, a twenty-year record of strong financial performance had turned to losses. EIL found itself out of cash, within three weeks of the expiration of a "forbearance agreement" imposed by the senior lender, with its impeccable reputation with longstanding customers under attack.

In the third specific example, amidst ambitious dreams of a regional franchising empire, Creative Health, Inc. ("CHI"), an entrepreneurial boutique of health food retailers, also found itself blindsided by a survival crisis. This time a gross overextension of company resources was exacerbated by legal conflicts and divisions among family Directors. Once again, a "big leap and creative disorder strategy" had threatened the life of what had been a promising family enterprise.

In the fourth specific example, a sixth-generation manufacturer of high technology machine tools, usually under international license, Precision Machines, Ltd ("PML") was already a family business "exception." From customers' commentaries—"honorable," "responsive," and "talented"—to employees who would "walk through a wall for that family," the company's reputation for excellence and integrity stretched far and wide. And while there had been some financial strains over a century-long existence, the business was currently doing well. But changes in corporate governance requirements imposed by leading licensors had presented the families' owners with an unwanted crisis not of their own making. To maintain alliance relationships critical to the business's future would demand radical changes in an ownership structure that otherwise was not broken.

In the fifth specific example, Heritage Airflow ("HA"), an early third-generation regional family wholesaler serving segments of the construction industry, seemed more and more in no-man's land as the pace of industry change was accelerating. Tradition and entrenched fiscal conservatism anchored a strong resistance to change, stretching from the Board down to branch employees. Most believed a strong work ethic and past reputation would continue to carry the day, even as profits declined, all growth stalled and employee turnover mushroomed. The real obstacles to successful change were failure to accept the need for it and fear of the unknown.

For the sixth specific example, one thing that made the founder of Tidewater Developers ("TD") so special was that he sought help regarding the future of his company, including succession, without being forced. The business had been unusually successful by "sticking to its knitting," combining a legendary client service ethic with superior execution skills and well thought-out extensions of products and channels. But a recent market diversification was threatening to become a mini-crisis. Moving successfully into the next era would be a challenge.

The family business vignettes discussed above as specific examples one through six hint that a "high entropy" approach to strategic change can, under certain circumstances, result in unintended and potentially severe consequences, leaving behind scars that may not easily heal.

The term "entropy" also refers to the dissipation of energy—that portion of energy not available to do something useful in a business, such as a family business system, undergoing change. Thus, to better assess the question of how much (and what kind of) change a given family business can successfully undertake within acceptable risk parameters, we need to understand something about the business's "energy."

The term "energy", or "corporate energy", is the sum of strategic and organizational attributes that make a business strong. These can include size, physical mass, speed, intensity of effort, infrastructure and technology, brands, market position, special or dominant core competencies, management depth and discipline, exceptional human resource development and financial capacity, as shown in Table 2(a) above.

Characteristics of corporate entropy might include propensity to change quickly and/or in great leaps, high risk tolerance, a tendency to randomness or unstructured organization, undisciplined style, contrariness, exceptional creativity and "broad" business unit diversity, as shown in Table 2(b) above.

It stands to reason that corporate energy, essential to long-term business success, is always best in high doses. The same, however, cannot be said about corporate entropy. Clearly too much is bad for the strategic health of the business, with consequences ranging from wasted energy, squandered opportunities and costly distractions in an otherwise well-positioned enterprise, to catastrophic failure in an organization lacking basic strategic, human capital and operational fundamentals.

If too much corporate entropy is bad, is very little good? It's not that simple. Too little is perhaps even more dangerous, risking corporate inertia, complacency, denial, missed opportunity, lack of innovation and, ultimately, even permanent loss of competitive viability.

Table 7 displays the Corporate Energy/Entropy Matrix™, proposing the strategic positioning of a business based upon its energy/entropy combination at a point in time. This presentation posits the High Energy/Medium Entropy position as the most advantageous, with Low Energy combined with either High or Low Entropy the most dangerous. The Corporate Energy/Entropy Matrix™ is useful for plotting the results of an entropy/energy analysis, conducted in at least some embodiments by examining attributes as shown in tables 2(a) and 2(b). Note the "cutpoint" numbers depicted on each axis. These numbers correspond with the attribute scoring as described in tables 2(a) and 2(b). The cutpoint numbers are assumed to be on each of the other representations of the Corporate Energy/Entropy Matrix™ as shown herein. However, the cutpoint numbers are not always shown for the sake of clarity.

TABLE 7

| CORPORATE ENERGY | | | CORPORATE ENTROPY | | |
|---|---|---|---|---|---|
| | | | Low | Medium | High |
| | High | 2.0–3.0 | Vulnerable | Juggernaut | Distracted, Sub Opitimized |
| | Medium | 1.0–2.0 | Threatened | Crossroads | Overextended, Vulnerable |
| | Low | 0.0–1.0 | Dead or Dying | Searching for Viability | Directionless, Out of Control |

Table 8 depicts the six family businesses, discussed hereinabove as specific examples, as they might have been placed at the important decision times presented (see arrows). In all but one (PML), the dashed arrows track the old paths of deteriorating strategic health. In hindsight, three of the four most notable declines depicted (EIL, NWC and CHI) had come about as the direct consequences of flawed strategies, ill-fated from the outset (whether from naiveté, inadequate human talent, shaky financial underpinnings, mediocre competitive strengths or some combination).

The fourth, HA, represents the inevitable outcome for a business mired in the past, extremely resistant to change and blind to advancements being implemented all around it in a dramatically changing industry.

TABLE 8

| CORPORATE ENERGY | | CORPORATE ENTROPY | | |
|---|---|---|---|---|
| | | Low | Medium | High |
| | High | Vulnerable | Juggernaut PML | Distracted, Sub Opitimized |
| | Medium | Threatened ←--- HA | ↖ TD Crossroads | ↖ EIL Overextended, Vulnerable ↖ NWC |
| | Low | Dead or Dying | Searching for Viability | ↖ CHI Directionless, Out of Control |

The good news for these businesses is that each of the six survived its crisis situation, and continued to prosper in some form. Three . . . PML, TD and HA . . . are still family businesses.

The independent directors on HA's Board spoke up in time. In less than three years, the underlying fundamentals . . . marketing segmentation, product lines, information systems, logistics and vender management, staff development and branch operations . . . were strengthened. A new non-family CEO brought a renewed spirit, coupled with more disciplined accountability. Today, third-generation family members remain in middle-level positions with ownership still "all in the family."

With just a little encouragement, the founder of TD followed his instincts. The distraction of the one product diversification was discontinued. A new non-family COO was carefully recruited, followed by strengthening the financial function. With project management and sales functions fine-tuned, the Founder was able to concentrate on strategic direction and more focused growth.

For PML, the decision process was remarkably easy as "doing what's right" was second nature. Selfish alternatives were never considered, and would have been summarily dismissed if presented. With agreement on two basic objectives (do what's right for the business, and try to keep it in the family), a plan was developed for a small group to buy out all others. No fighting, no arguing, no pettiness; just unanimous approval (of twenty-seven shareholders) and a smooth closing. The "Juggernaut" rolls on today.

The remaining three examples are no longer family businesses, two of which by choice.

NWC's Board, comprised of very talented third generation descendents of the three founding families, reasserted itself. Realizing that excessive corporate entropy had outstripped the company's underlying capability, and sensing an unacceptable level of risk, the Board moved swiftly to position Northwest Cathodic for sale to a strategic buyer with the missing expertise and adequate resources. The Board acted in time and shareholders received attractive value.

The process took longer at EIL. Over eighteen months, an interim CEO directed the unwinding of the two ill-conceived acquisitions, strengthened the third (in Asia), returned operations to profitability and reduced and refinanced debt, while mentoring two members of the second generation. One became CEO at the process's conclusion. Less than three years later, the family seized an opportunity to sell to a strategic buyer that coveted the Founder's original creation. EIL had come a long way back.

The CHI operating business thrives today, but no longer under family ownership and control. Too much time had gone by, with the cumulative weight of the business's problems too great to solve in time by any way other than a sale. The good news for employees, franchisees, and customers was the commitment and resources of the new corporate owner. The brand and concept lived on and expansion resumed within fifteen months.

Conceptual roots of entropy reveal certain other implications: (1) change is constant and unrelenting, and (2) all natural processes are to some degree irreversible. In simple terms, this means there are no mulligans. A family business can't go back and start over and expect the surrounding world to be just as it was. Denial and delay are not benign, with potentially tragic consequences for the perpetuity of a family business (remember CHI).

A progressive family business knows that its position on the Energy/Entropy Matrix (Table 7) is constantly in flux; forces driving movements are continuous. It understands the natural tendency of things to come apart, and thus fixes things that aren't broken (PML, TD) or at least before it's too late (EIL, NWC). And, unlike the fleetingly successful (it knows that one good idea never lasts forever). Family businesses are certainly prone to lying at the undesirable extremes of the corporate entropy spectrum. Ponderous decision processes, complex financial or tax constraints, or just simple painavoidance can characterize Low Entropy. Excessive diversifications that distract and overextend the business to satisfy objectives of particular family members suggest High Entropy. But while neither is good, these tendencies are neither confined to nor necessarily more pronounced in family enterprises as opposed to businesses as a whole.

Desirable paths for change in most businesses revolve around increasing and enhancing attributes of corporate energy (e.g., moving up on the Corporate Energy/Entropy Matrix™ and staying there).

Creating and enhancing those things that make a business special, keeping it vital and competitively strong, is a difficult and never-ending process. Consistent success demands that (1) talented people occupy all functions of the business; (2) a culture of accountability; and (3) leadership focused first on what's best for the enterprise itself.

Perhaps pressures to deviate from such a disciplined philosophy can be greater in a family versus a non-family business. A lesson of the Corporate Energy/Entropy Matrix™ is that the stronger the business to begin with (i.e., its Corporate Energy), the wider its options and better its odds of success during the inevitable periods of change.

A concept of assessing the strategic health of a business through the interaction of certain attributes that collectively comprise "Corporate Energy" and "Corporate Entropy" is presented below.

"Corporate Energy" represents the sum of a company's core competencies, competitive strengths and human capital. "Corporate Entropy" depicts the business's propensity and capacity to change. The intersection of Corporate Energy and Corporate Entropy and the resultant impact on an organization's health and outlook is presented in The Corporate Energy/Entropy Matrix™ (Table 7).

A vibrant business, well-positioned because it combines impressive strategic assets and the right capacity to drive change doesn't come about by chance. It takes the right leadership mix, depth and management processes under-girding the business itself.

Corporate energy can be seen as the sum of strategic and organizational assets that make a business strong. Corporate entropy represents the propensity and capacity of a business to change.

Table 7, as already noted, displays the Corporate Energy/Entropy Matrix™, proposing the strategic positioning of a business based upon its energy/entropy intersection. This presentation posits the "High Energy/Medium Entropy" position as the best place to be, with "Low Energy" combined with either "High" or "Low Entropy" the most dangerous.

The most valuable benefits arising from the Corporate Energy/Entropy Matrix™ begin with pinpointing a business's true "starting point" from which to develop new strategy. In actual practice, doing so depends upon an analytical structure including quantitative analyses, various internal and external surveys, an understanding of an organization's culture and value system, management and shareholder judgments, and intuition. Such broad-based information produces (a) an objective assessment of strategic implications for the family business's stakeholders, (b) more targeted clues to drive effective strategy development, and, (c) a consistent means of tracking the business's future performance in real time.

The seventh specific example looks at the case of Polymeric Compounders, Ltd. (hereinafter, Polymeric). A fifty-year-old late third-generation family business, Polymeric found itself in a textbook situation: (a) a patriarch's declining health; (b) diverging viewpoints and objectives within the third-generation sibling group; (c) stalled growth across a diverse group of businesses, loosely linked by competencies in chemical compounding and packaging, with products serving somewhat similar retail distribution channels; (d) a dramatically changing competitive landscape in its largest business unit; and (e) eroding financial performance.

The company and family had already taken positive steps to enhance management depth and strengthen corporate governance. Acting upon advice from trusted legal and wealth management advisors, the Board of Directors had been restructured to include two truly independent members with the right kinds of experience. And, a seasoned non-family member with a great track record had been recruited to become Chief Executive Officer, while a third-generation family member became Chairman. These events had set the stage for figuring out what should come next for the operating units.

It took several months, including outside assistance, to complete a comprehensive due diligence process to examine objectively the state of Polymeric's businesses and organization. The entire management team, numerous employees, Board members and family members not Board members participated. Customers and employees alike were interviewed, numbers were crunched, industry data and trends examined, hypotheses were tested. The analytical road map looked remarkably like the Performance Indicators in Tables 2 (a) and 2 (b)! For two months thereafter, the new CEO and his team met frequently as a group to consider the implications and craft a new plan.

Using the scale from Tables 2(a) and 2(b), the composite starting point of Polymeric for both corporate energy and corporate entropy hovered on the boundaries between "Low" and "Medium," thus straddling the "four corners" on the lower left of the Corporate Energy/Entropy Matrix™.

Performance Indicators contributing to "Corporate Energy" strength were concentrated in the indicators dealing with unity of purpose, the strength of the new Board, and the improving discipline and accountability already taking hold. Corresponding weaknesses were almost all in quantitative indicators: financial ratios and thus the inability to sustain growth, the aging infrastructure, and the primarily undifferentiated products and weak market positions in certain business units.

Remembering that the desirable positioning for corporate entropy is in the middle, noteworthy strengths were identified to be willingness to spend on product development and marketing, a manageable debt load, a good mix of skills in people and an open-mindedness about trying new things and revisiting product ideas from the past. Significant entropy "weaknesses" (coming from both extremes) included excessive financial risk (poor margins in certain businesses), considerable risk aversion manifested as perceived impatience with new product development, too much unrelated business unit diversity, and a high "payout" ratio to shareholders. Not withstanding the overall message, the "good news" was that team "buy-in" to the implications was quick, and insights into "where to go from here" were clarified.

Polymeric's team crafted a new three-year Strategic Plan (the "Plan"). Accomplishment of the Plan's objectives would strengthen corporate energy in significant ways, with divestment of one money-losing business unit and streamlining the product line and customer segmentation of another; thus lowering overall breakeven point, improving-scalability and operating effectiveness, and raising financial ratio performance relative to a published peer group. Commitments were also made to upgrade infrastructure technology and replace some aging plant and equipment. corporate entropy would move toward the desired center by reducing (a) distractions from underperforming businesses, and (b) financial risk, while enhancing (a) new product development resources while clarifying objectives and priorities, (b) focusing on those product categories where clear leadership was possible, and (c) creating a cross-functional innovation council for oversight of the development and product introduction process.

The collective impact of the Plan would be to move Polymeric in the positive direction, away from the danger zone (the lower left of the Corporate Energy/Entropy Matrix™) to a position able to deliver better economic results (including the Top Quartile return on assets) and thus solidify a long-term platform for continued upward momentum and sustainable growth (well into the middle zone of the Corporate Energy/Entropy Matrix™).

The Performance Indicators shown in Tables 2(a) and 2(b) were deemed appropriate and manageable (in number and complexity) for Polymeric Compounders, a medium-sized ($50-100 million annual revenue) family business of modest complexity. The method can be readily adjusted to fit a business that is either smaller and simpler, or larger and more complex.

Numerous external sources exist for data that is useful in an energy and entropy analysis for determining the strategic health of a business entity. Perhaps the most renowned source of "peer" financial performance benchmarks and ratios for smaller and middle-market businesses is the Annual Statement Studies published each fall by The Risk Management Association. Literally hundreds of industry economic categories are covered, segmented by size, type of business, and North American Industry Classification System (NAICS) (which replaced the old Standard Industrial Classification (SIC) under auspices of the United States Census Bureau). In Polymeric's case, some additional information was available to members of a trade group. Market data (size, growth rates, trends, etc.) is generally available from public sources, trade groups and/or government agencies.

The availability and quality of information internal to the business entity can vary dramatically. Note that this issue is a relevant "infrastructure" attribute in the assessment of corporate energy.

Note in Tables 2(a) and 2(b) that Low, Medium and High on each axis of the Corporate Energy/Entropy Matrix™ are scored as 1, 2 and 3, respectively. Occasionally there is a "zero" score for a particular indicator. These represent certain instances in which "Don't Know, Not Sure," or some other characteristic, is considered a negative in terms of the actual assessment. See Table 7 for a depiction of the scoring cut-points on the Corporate Energy/Entropy Matrix™.

The entire assessment and planning process is greatly enhanced by active participation by the family business team. At Polymeric, the strategic plan was created by the family business team, hence buy-in came naturally. The very detailed implementation plan, including timelines and responsibilities was prepared and ultimately monitored by them.

FIG. 2 is a system block diagram according to example embodiments of the invention. FIG. 2 actually illustrates two alternative embodiments of the invention. System 202 can be a workstation or personal computer. System 202 can be operated in a "stand-alone" mode. The system includes a fixed storage medium, illustrated graphically at 204, for storing programs and/or macros which enable the use of an embodiment of the invention. In a stand-alone implementation of the invention, data store 204 can include the data sets which are necessary to implement an embodiment of the invention. For example, data imported from the external data stores can be stored in data store 204 for use in the invention. In this particular example, the input/output devices 216 include an optical drive 206 connected to the computing platform for loading the appropriate computer program product into system 202 from an optical disk 208. The computer program product includes a computer program or programs with instructions or code for carrying out the methods of the invention. Instruction execution platform 210 of FIG. 2 includes a microprocessor, or central processing unit (CPU), and supporting circuitry and can execute the appropriate instructions and display appropriate screens on display device 212.

FIG. 2 also illustrates another embodiment of the invention in which case the system 220 which is implementing the invention includes a connection to data stores from which data from energy attributes data 224, entropy attributes data 226, and lists of linkages between energy and entropy 228 can be retrieved. The connection to the data stores or appropriate databases can be formed in part by network 222. The connection to the data stores or appropriate databases can be formed in part by network 222, which can be an intranet, virtual private network (VPN) connection, local area network (LAN) connection, or any other type of network resources, including the internet. Data sets can be local, for example on data store 204, or stored on the network, for example in data store 224, 226, or 228. The system imports data from disparate data stores (for example, data stores 224, 226, and 228) and enables searching of the imported data.

A computer program which implements all or parts of the invention through the use of systems like those illustrated in FIG. 2 can take the form of a computer program product 214 residing on a computer usable or computer readable storage medium. Such a computer program can be an entire application to perform all of the tasks necessary to carry out the invention, or it can be a macro or plug-in which works with an existing general purpose application such as a spreadsheet or database program. Note that the "medium" may also be a stream of information being retrieved when a processing platform or execution system downloads the computer program instructions through the internet or any other type of network. Computer program instructions which implement the invention can reside on or in any medium that can contain, store, communicate, propagate or transport the program for use by or in connection with any instruction execution system, apparatus, or device. Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or flash memory), a compact disc read-only memory (CD-ROM), or other optical or magnetic storage device; or transmission media such as those supporting the internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and stored in a computer memory.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A computer-implemented method of calculating a metric indicative of a business entity's strategic health at a specific point in time, comprising:
    determining a measurement of energy, wherein at least one component of the measurement of energy is weighted;
    determining a measurement of entropy, wherein at least one component of the measurement of entropy is weighted;
    identifying at least one linkage between the energy measurement and the entropy measurement;
    calculating, using a computing device processor, based on the measurement of energy, the measurement of entropy, and the at least one identified linkage, a strategic health metric indicative of the business entity's strategic health at the specific point in time;
    creating a graphical representation of the strategic health metric;
    calculating at least a second metric indicative of the business entity's current strategic health at an at least second point in time;
    modifying the graphical representation to include the second metric; and
    comparing the strategic health metric with the at least one second strategic health metric to determine whether the business entity's strategic health is changing over time.

2. The method of claim 1, wherein the measurement of energy is a sum of strategic and organizational attributes that make the business entity strong.

3. The method of claim 1, wherein the measurement of entropy is a measurement of the business entity's propensity and capacity to change.

4. The method of claim 1, wherein determining the measurement of energy comprises: calculating a metric for size, mass and scalability of the business entity; calculating a metric for speed, intensity, and unity of purpose of the business entity; calculating a metric for infrastructure and technology in the business entity; calculating a metric for brands, market position and power of the business entity; calculating a metric for special or dominant competencies of the business entity; calculating a metric for depth of management and exceptional human resource development in the business entity; calculating a metric for discipline and accountability within the business entity; and calculating amount of additional financial resources likely available to the business entity.

5. The method of claim 1, wherein determining the measurement of entropy comprises: calculating a metric for propensity of the business entity to change quickly and/or in great leaps; calculating a metric for the business entity's tolerance to high risk; calculating a metric for the business entity's tendency towards random, fluid structure; calculating a metric for contrariness, irreverence, independent thinking and ways of dealing with ambiguity within the business entity; calculating a metric for presence of exceptional creativity within the business entity; and calculating a metric for broad business unity diversity within the business entity.

6. The method of claim 1, wherein the business entity is a family business.

7. A data processing system for producing a metric indicative of a business entity's strategic health, the data processing system comprising:
    a database comprising attributes of energy;
    a database comprising attributes of entropy;
    a database comprising linkages between energy and entropy; and
    a central processing unit (CPU) and computer program code, execution of which causes the CPU to:
        determine a measurement of energy, wherein at least one component of the measurement of energy is weighted;
        determine a measurement of entropy, wherein at least one component of the measurement of entropy is weighted;
        identify at least one linkage between the energy measurement and the entropy measurement;
        calculate a metric indicative of the business entity's current strategic health based on the attributes of energy, the attributes of entropy, and the linkages between energy and entropy;
        create a graphical representation of the strategic health metric;
        calculate at least a second metric indicative of the business entity's current strategic health at an at least second point in time;
        modify the graphical representation to include the second metric; and
        compare the strategic health metric with the at least one second strategic health metric to determine whether the business entity's strategic health is changing over time.

8. The data processing system of claim 7, wherein the measurement of energy is a sum of strategic and organizational attributes that make the business entity strong.

9. The data processing system of claim 7, wherein the measurement of entropy is a measurement of the business entity's propensity and capacity to change.

10. The data processing system of claim 7, wherein determining the measurement of energy comprises: calculating a metric for size, mass and scalability of the business entity; calculating a metric for speed, intensity, and unity of purpose of the business entity; calculating a metric for infrastructure and technology in the business entity; calculating a metric for brands, market position and power of the business entity; calculating a metric for special or dominant competencies of the business entity; calculating a metric for depth of management and exceptional human resource development in the business entity; calculating a metric for discipline and accountability within the business entity; and calculating amount of additional financial resources likely available to the business entity.

11. The data processing system of claim 7, wherein determining the measurement of entropy comprises: calculating a metric for propensity of the business entity to change quickly and/or in great leaps; calculating a metric for the business entity's tolerance to high risk; calculating a metric for the business entity's tendency towards random, fluid structure; calculating a metric for contrariness, irreverence, independent thinking and ways of dealing with ambiguity within the business entity; calculating a metric for presence of exceptional creativity within the business entity; and calculating a metric for broad business unity diversity within the business entity.

12. The data processing system of claim 7, wherein the business entity is a family business.

13. A computer program product, the computer program product comprising a non-transitory medium with a computer readable program code embodied therein, the computer readable program code for execution by an instruction execution platform to implement a method of calculating a metric indicative of a business entity's strategic health at a specific point in time, comprising:
   determining a measurement of energy, wherein at least one component of the measurement of energy is weighted;
   determining a measurement of entropy, wherein at least one component of the measurement of entropy is weighted;
   identifying at least one linkage between the energy measurement and the entropy measurement;
   calculating, using a computing device processor, based on the measurement of energy, the measurement of entropy, and the at least one identified linkage, a strategic health metric indicative of the business entity's strategic health at the specific point in time;
   creating a graphical representation of the strategic health metric;
   calculating at least a second metric indicative of the business entity's current strategic health at an at least second point in time;
   modifying the graphical representation to include the second metric; and
   comparing the strategic health metric with the at least one second strategic health metric to determine whether the business entity's strategic health is changing over time.

14. The computer program product of claim 13, wherein the measurement of energy is a sum of strategic and organizational attributes that make the business entity strong.

15. The computer program product of claim 13, wherein the measurement of entropy is a measurement of the business entity's propensity and capacity to change.

16. The computer program product of claim 13, wherein determining the measurement of energy comprises: calculating a metric for size, mass and scalability of the business entity; calculating a metric for speed, intensity, and unity of purpose of the business entity; calculating a metric for infrastructure and technology in the business entity; calculating a metric for brands, market position and power of the business entity; calculating a metric for special or dominant competencies of the business entity; calculating a metric for depth of management and exceptional human resource development in the business entity; calculating a metric for discipline and accountability within the business entity; and calculating amount of additional financial resources likely available to the business entity.

17. The computer program product of claim 13, wherein determining the measurement of entropy comprises: calculating a metric for propensity of the business entity to change quickly and/or in great leaps; calculating a metric for the business entity's tolerance to high risk; calculating a metric for the business entity's tendency towards random, fluid structure; calculating a metric for contrariness, irreverence, independent thinking and ways of dealing with ambiguity within the business entity; calculating a metric for presence of exceptional creativity within the business entity; and calculating a metric for broad business unity diversity within the business entity.

18. The computer program product of claim 13, wherein the business entity is a family business.

19. An apparatus for calculating a metric indicative of a business entity's strategic health at a specific point in time, the apparatus comprising:
   a memory device; and
   a processing device, operatively coupled to the memory device, and configured to execute computer readable program code to:
   determine a measurement of energy, wherein at least one component of the measurement of energy is weighted;
   determine a measurement of entropy, wherein at least one component of the measurement of entropy is weighted;
   identify at least one linkage between the energy measurement and the entropy measurement;
   calculate, based on the measurement of energy, the measurement of entropy, and the at least one identified linkage, a strategic health metric indicative of the business entity's strategic health at the specific point in time;
   create a graphical representation of the strategic health metric;
   calculate at least a second metric indicative of the business entity's current strategic health at an at least second point in time;
   modify the graphical representation to include the second metric; and
   compare the strategic health metric with the at least one second strategic health metric to determine whether the business entity's strategic health is changing over time.

20. The apparatus of claim 19, wherein the measurement of energy is a sum of strategic and organizational attributes that make the business entity strong.

21. The apparatus of claim 19, wherein the measurement of entropy is a measurement of the business entity's propensity and capacity to change.

22. The apparatus of claim 19, wherein determining the measurement of energy comprises: calculating a metric for size, mass and scalability of the business entity; calculating a metric for speed, intensity, and unity of purpose of the business entity; calculating a metric for infrastructure and technology in the business entity; calculating a metric for brands, market position and power of the business entity; calculating a metric for special or dominant competencies of the business entity; calculating a metric for depth of management and exceptional human resource development in the business entity; calculating a metric for discipline and accountability within the business entity; and calculating amount of additional financial resources likely available to the business entity.

23. The apparatus of claim 19, wherein determining the measurement of entropy comprises: calculating a metric for propensity of the business entity to change quickly and/or in great leaps; calculating a metric for the business entity's tolerance to high risk; calculating a metric for the business entity's tendency towards random, fluid structure; calculating a metric for contrariness, irreverence, independent thinking and ways of dealing with ambiguity within the business entity; calculating a metric for presence of exceptional creativity within the business entity; and calculating a metric for broad business unity diversity within the business entity.

24. The apparatus of claim 19, wherein the business entity is a family business.

* * * * *